(12) United States Patent
Long

(10) Patent No.: US 10,883,286 B2
(45) Date of Patent: Jan. 5, 2021

(54) BUILDING DEBRIS CONTAINMENT SYSTEM

(71) Applicant: Robert Long, N. Billerica, MA (US)

(72) Inventor: Robert Long, N. Billerica, MA (US)

(*) Notice: Subject to any disclaimer, the term of this patent is extended or adjusted under 35 U.S.C. 154(b) by 0 days.

(21) Appl. No.: 16/738,582

(22) Filed: Jan. 9, 2020

(65) Prior Publication Data
US 2020/0232236 A1 Jul. 23, 2020

Related U.S. Application Data

(60) Provisional application No. 62/890,106, filed on Aug. 22, 2019, provisional application No. 62/881,416, filed on Aug. 1, 2019, provisional application No. 62/869,255, filed on Jul. 1, 2019.

(51) Int. Cl.
*E04G 21/32* (2006.01)
*E04G 21/24* (2006.01)

(52) U.S. Cl.
CPC ......... *E04G 21/3266* (2013.01); *E04G 21/24* (2013.01); *E04G 2021/248* (2013.01)

(58) Field of Classification Search
CPC .............. E04G 21/3266; E04G 21/24; E04G 2021/248
See application file for complete search history.

(56) References Cited

U.S. PATENT DOCUMENTS

| | | | |
|---|---|---|---|
| 6,938,785 B2 * | 9/2005 | Denny | A47F 13/00 211/183 |
| 7,389,855 B2 * | 6/2008 | Rexroad | E04G 21/3266 182/138 |
| 10,030,397 B2 * | 7/2018 | Stearns | E04G 21/3266 |

* cited by examiner

*Primary Examiner* — Patrick J Maestri
(74) *Attorney, Agent, or Firm* — Nutter McClennen & Fish LLP

(57) ABSTRACT

A debris containment system includes channel units that are configured to attach to perimeter structural members of the building (e.g., vertical columns and/or horizontal beams) and extend outward from the perimeter of the building. Channel units can be produced in any length or lengths needed for a given application. These channel units are used to lift and support barrier members (e.g., nets, tarps, canvas/fabric, or other barrier members) to create barriers along the perimeter of the building. Importantly, these channel units are generally attached directly or indirectly (e.g., via temporary vertical members) to structures that will remain on the building (e.g., structural columns and beams of the building) as opposed to being used with separate framing structures erected outside of the building perimeter, although in some exemplary embodiments, channel units can be used on structures erected outside of the perimeter of the building.

30 Claims, 38 Drawing Sheets

FIG. 14 — Barrier Member with Side Flaps and Cable

Outrigger with extension

BUILDING DEBRIS CONTAINMENT SYSTEM

CROSS-REFERENCE TO RELATED APPLICATION(S)

This patent application claims the benefit of each of the following United States Provisional Patent applications, each of which is hereby incorporated herein by reference in its entirety:

U.S. Provisional Patent Application No. 62/869,255 entitled BUILDING DEBRIS CONTAINMENT SYSTEM filed Jul. 1, 2019;

U.S. Provisional Patent Application No. 62/881,416 entitled BUILDING DEBRIS CONTAINMENT SYSTEM filed Aug. 1, 2019; and U.S. Provisional Patent Application No. 62/890,106 entitled BUILDING DEBRIS CONTAINMENT SYSTEM filed Aug. 22, 2019.

FIELD OF THE INVENTION

The invention generally relates to debris containment systems for buildings such as for use during erection of a building.

BACKGROUND OF THE INVENTION

Construction of high-rise buildings often requires or involves the use of protective netting systems such as to prevent building materials from sliding or blowing off of open floors as the building is being erected. Typically, a "cocoon" of netting is erected around the building using separate framing structures such as separate support columns and beams erected outside of the building perimeter. Among other things, such separate framing represents a large amount of additional material that must be delivered to the construction site, erected, and removed from the construction site when no longer needed. Erection of such separate framing generally involves a great deal of time and expense, e.g., involving cranes that must be kept on site.

SUMMARY OF VARIOUS EMBODIMENTS

In accordance with various embodiments of the invention, a debris containment system includes channel units that are configured to attach to perimeter structural members of the building (e.g., vertical columns and/or horizontal beams) and extend outward from the perimeter of the building. Channel units can be produced in any length or lengths needed for a given application. These channel units are used to lift and support barrier members (e.g., nets, tarps, canvas/fabric, or other barrier members) to create barriers along the perimeter of the building. Importantly, these channel units are generally attached directly or indirectly (e.g., via temporary vertical members) to structures that will remain on the building (e.g., structural columns and beams of the building) as opposed to being used with separate framing structures erected outside of the building perimeter, although in some exemplary embodiments, channel units can be used on structures erected outside of the perimeter of the building.

In accordance with one embodiment of the invention, a channel unit for installing barrier members on a building includes an elongated body having a proximal end, a distal end, and a mount at the proximal end of the elongated body configured for mounting the channel unit onto a support member at an outer perimeter of the building such that the distal end of the elongated body extends past the outer perimeter of the building. The channel unit also includes a pair of adjacent line supports at the distal end of the elongated body including a left side line support configured to support a left side line used to lift and support a first barrier member and a right side line support configured to support a right side line used to lift and support a second barrier member.

In various alternative embodiments, the adjacent line supports may include pulleys, the elongated body may be made of any appropriate material such as steel or aluminum, the elongated body may be extendable to different lengths, the mount may include a mounting plate, the mount may be configured to mount to the support structure using at least one retainer, and/or the mount and the support structure may include corresponding mounting elements by which the channel unit is mounted to the support structure.

Additionally or alternatively, a channel unit also may include a pair of adjacent bottom vertical support member anchors at a bottom distal end of the elongated body including a left side bottom vertical support member anchor configured to secure a left side bottom vertical support member to a lower-level channel unit and a right side bottom vertical support member anchor configured to secure a right side bottom vertical support member to the lower-level channel unit. The bottom vertical support member anchors may include ringlets. The bottom vertical support member anchors may be disposed on a transverse extension at the distal end of the channel unit. A channel units may be provided with the left side bottom vertical support member and/or the right side bottom vertical support member, which may be adjustable-length vertical support members (e.g., adjustable length rods or cables, or telescoping poles). In some embodiments, the left side line may be used to lift the first barrier member along the left side bottom vertical support member and the right side line may be used to lift the second barrier member along the right side bottom vertical support member.

Additionally or alternatively, a channel unit also may include a pair of adjacent top line anchors at a top proximal end of the elongated body including a left side top line anchor configured to secure a first line from an upper-level channel unit and a right side top line anchor configured to secure a second line from the upper-level channel unit.

Additionally or alternatively, a channel unit also may include a pair of adjacent top vertical support member anchors at a top distal end of the elongated body including a left side top vertical support member anchor configured to secure a left side top vertical support member to an upper-level channel unit and a right side top vertical support member anchor configured to secure a right side top vertical support member to the upper-level channel unit.

In any of the above embodiments, the channel unit may be configured to mount to virtually any type of support structure such as, for example, to a perimeter structural member of the building or to a temporary vertical support member that is configured to attach to a perimeter structural member of the building.

Embodiments of the present invention also include a support member for mounting a channel unit to a building, where the support member includes at least one mounting element configured to mount a channel unit of the types described herein. The support member may be, for example, a vertical column, a horizontal beam, an "I" or "H" beam, etc. The mounting elements used to mount the channel may be positioned on a flange of support member or may be positioned on a web of the support member.

Embodiments of the present invention also include a building including a support member of the types described herein.

Embodiments of the present invention also include a barrier member configured for use with a channel unit of the types described herein. The barrier member may include a net, tarp, or other materials. The barrier member may include a plurality of grommets or other elements for securing the barrier member to a vertical support member. The barrier member may include a return portion and/or side flaps.

Embodiments also include methods of engineering a building and building components to include mounting elements (e.g., holes, anchors/sleeves, bars, plates) at locations where channel units and other components (e.g., vertical support members and base members) are to be installed, methods of installing channel units and other components (e.g., vertical support members and base members) such as using bolts or other retainers, and methods raising and lowering barrier members using the channel units and related components.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

Figure 1:
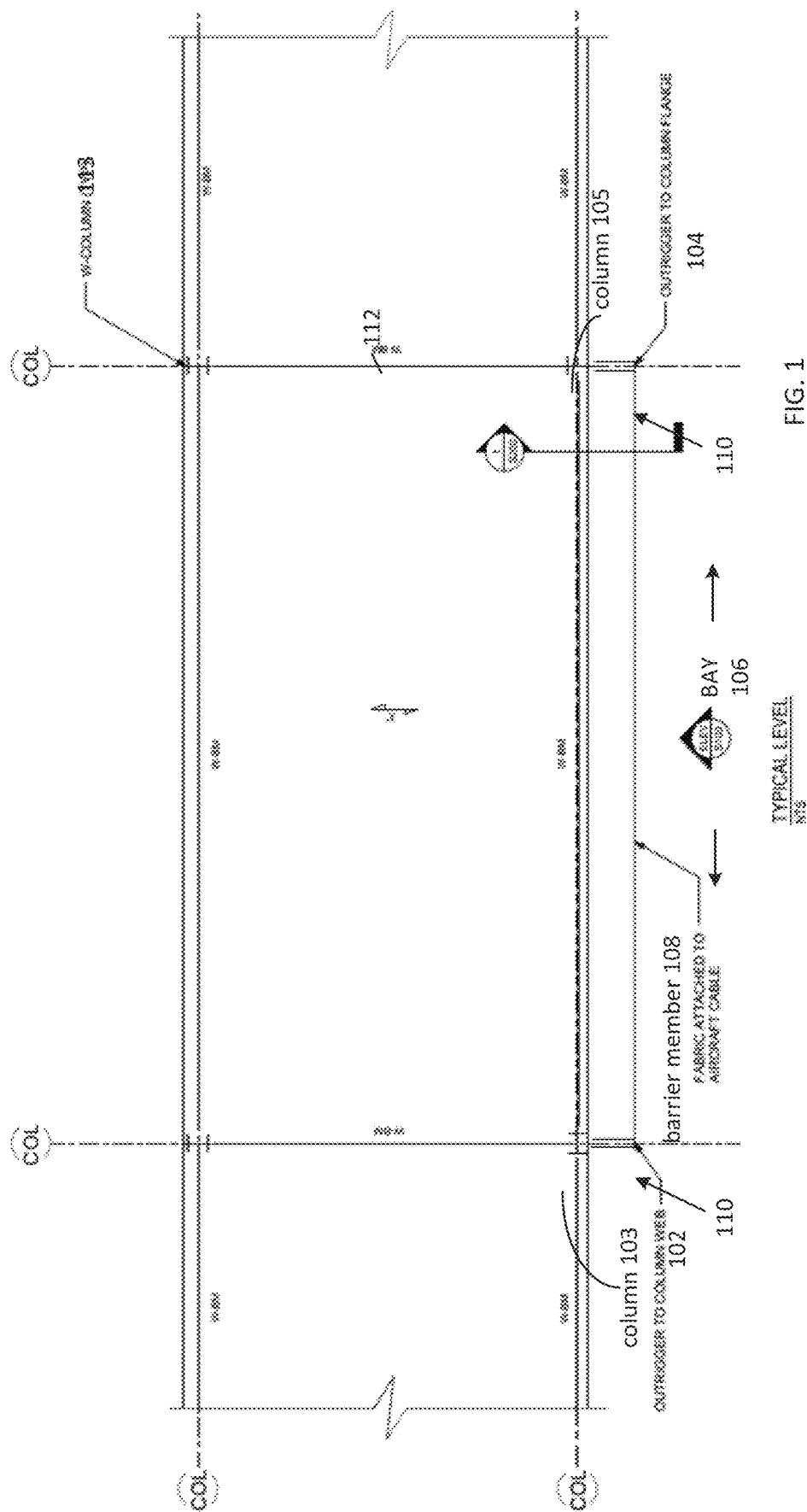
FIG. 1 is a schematic diagram showing a top-down view of a portion of a building having a bay with two channel units (outriggers) and a barrier member (fabric), in accordance with one exemplary embodiment.

Definitions. As used in this description and the accompanying claims, the following terms shall have the meanings indicated, unless the context otherwise requires.

The term "column" is used herein to refer to a vertical support structure for a building. Columns are generally formed with an "I" or "H" shaped cross-section, although other types of columns may be used in various embodiments (e.g., square, round, etc.). Columns are generally made of structural steel, although other materials may be used in various embodiments. Often, columns are produced in lengths corresponding to two floors of a building, although columns may be produced in other lengths. Columns generally support walls of the building.

The term "beam" is used herein to refer to a horizontal support structure for a building. Beams are generally formed with an "I" or "H" shaped cross-section, although other types of beams may be used in various embodiments (e.g., square, round, etc.). Beams are generally made of structural steel, although other materials may be used in various embodiments. A beam may be supported between two columns and/or may extend beyond a column, e.g., in a cantilever arrangement. Beams are often formed with an "I" or "H" shaped cross-section. Beams generally support floors/ceilings of the building.

With regard to a column or beam having an "I" or "H" shaped cross-section, the term "flange" is used herein to refer to the two outer side elements while the term "web" is used herein to refer to the single element connected between the two flanges.

The term "bay" is generally used to refer to the space on a building floor that is situated between two columns at the edge of the building.

Exemplary embodiments provide a debris containment system designed to encapsulate all or part of a building in order to contain building materials during the construction process. It is envisioned that the debris containment system can be used on projects that require the protection of the public from falling debris. Without limitation, the main objective of the debris containment system is to stop construction debris from falling off the derrick/erections floor to any level below. Embodiments are designed with public safety and erection efficiency as the focus and is intended for use in addition to typical fall protection systems.

In exemplary embodiments, the debris containment system includes channel units (which may be referred to herein as "outriggers") that are configured to attach to various types of support members at or near the perimeter of a building using bolts or other fasteners (e.g., to attach to perimeter structural members of the building such as columns and/or beams of the building, or to attach to temporary vertical support members that in turn attach to other building structures such as at the end of a cantilever structure, at the top of an outer building column, onto a deck or concrete slab, etc., to hold channel units at appropriate positions) and extend outward from the perimeter of the building, typically horizontally (although other orientations are possible). Channel units can be produced in any length or lengths needed for a given application (e.g., channel units supported by a line of columns might need to be different lengths in order to extend beyond a rounded perimeter section of a building). These channel units are used to lift and support barrier members (e.g., nets, tarps, canvas/fabric, or other barrier members) to create barriers along the perimeter of the building, as discussed in more detail below. Importantly, these channel units are generally attached directly or indirectly (e.g., via temporary vertical members) to structures that will remain on the building (e.g., structural columns and beams of the building) as opposed to being used with separate framing structures erected outside of the building perimeter, although in some exemplary embodiments, channel units can be used on structures erected outside of the perimeter of the building. Thus, the use of these channel units should significantly reduce the time and cost of construction because they are placed on members that are part of the building itself and therefore eliminate the need for the erection of a separate framing structure. When no longer needed, the channel units are removed from the structural members, thereby leaving the structural members of the building in place.

A structural member can be configured to support one or more channel units. Channel units can be attached to a structural member on the flange(s) and/or web of the structural member depending on, for example, the location and orientation of the structural member in the building plan and the desired orientation(s) of the channel unit(s) to be supported by the structural member. Typically, channel unit(s) will be mounted to a structural member at the job site before the structural member is put into position in the building, such that the channel units are positioned along with the positioning of the structural members of the building as it is being erected.

In specific exemplary embodiments, the channel units are configured to attach to structural members using bolts, and structural members that will be used to support channel units are fabricated with mounting holes at appropriate locations at which the channel units can be bolted to the structure members. Each channel unit typically includes a mounting plate at a proximal end, where the mounting plate has complementary mounting holes to align with corresponding mounting holes of a structural member.

FIG. 1 is a schematic diagram showing a top-down view of a portion of a building having a bay with two channel units (outriggers) and a barrier member (fabric), in accordance with one exemplary embodiment. In this exemplary embodiment, the columns are generally sized for two stories of the building such that there is one channel unit for two floors of the building. Here, outrigger 102 is attached to the web of column 103, while outrigger 104 is attached to the outside flange of column 105 (in this example, columns 103 and 105 are oriented differently, which warrants the different placements of the outriggers 102 and 104). The area between columns 103 and 105 represents bay 106. The outriggers 102 and 104 support barrier member 108 (which, in this example, is fabric) that is supported along its sides by vertical support structures 110 (which, in this example, are aircraft cables), as described in greater detail below. In this example, column 105 supports a beam 112 that spans from column 105 to column 113. Note here that the outrigger 102 generally would be longer than the outrigger 104 so that the outriggers extend the same distance outward from the perimeter of the building, i.e., because outrigger 102 attaches to the web of column 103 while outrigger 104 attaches to the flange of column 105.

In exemplary embodiments, each channel unit includes a pulley system at a distal end. Typically, the pulley system includes two pulleys placed side-by-side so that a single channel unit can support two barrier members such as at the border between two adjacent bays, e.g., where the barrier member for one bay can be lifted and supported using one pulley of the channel unit and the barrier member for the other bay can be lifted and supported using the other pulley of the channel unit. Typically, channel units are positioned at both sides of each bay so that a barrier member can be lifted from both sides. In order to lift and support a barrier member, a line (e.g., rope or cable) is passed over a pulley of a channel unit, with one end of the line extending down and attached to the top corner of a barrier member, and with the other end of the rope or cable used to lift the top corner of the barrier member up to the channel unit, which may be done by manually or mechanically (e.g., using a crank or winch). Each line is generally long enough to reach from a ground or lower building level at which the barrier member is located up to the channel unit and back down to the ground or lower building level. Once the barrier member is lifted into place, the end of the rope or cable used to lift the barrier member can be secured, e.g., to a ringlet or other anchor positioned near the proximal end of the channel unit.

Furthermore, in exemplary embodiments, the bottom of the barrier member includes a return portion (e.g., essentially an extended portion of material, e.g., 3 feet of material) that is attached back into the building in order to bridge the gap that otherwise would exist between the bottom of the barrier member and the building and prevent debris from falling down between that gap. Typically, each floor of the building has safety stanchions that hold two lines, as required by OSHA for perimeter safety. In certain exemplary embodiments, the return portion of the barrier member would be attached to the existing safety stanchions or to a third line added to these existing safety stanchions, e.g., using carabiners or other fasteners that attach to the return portion of the barrier member (e.g., through a row of grommets placed along the bottom edge of the barrier member) and to the safety stanchions or to the third line supported by the safety stanchions.

In exemplary embodiments, a support structure (e.g., metal rods or cables that can be tightened using a turnbuckle, or a telescoping pole) is attached from the bottom of a given channel unit to the top of an underlying channel unit previously installed directly below at a lower level. The support structure may be secured to ringlets or other anchors positioned near the distal end of the channel units (e.g., a channel unit may include four ringlets or anchors positioned near the distal end, with two on the bottom for connecting support structures to an underlying channel unit along both sides of a bay and with two on the top for connecting support structures to an overlying channel unit along both sides of a bay). A side of the barrier member can be secured to a support structure, e.g., using carabiners or other fasteners that attach to the side of the barrier member (e.g., through a row of grommets placed along the side edge of the barrier member) and to the support structure. Among other things, securing the barrier member along its sides can ensure that the barrier member remains in place to cover the bay. It should be noted that additional supporting members can be used to further support the barrier member, e.g., one or more horizontal rods or cables supporting the barrier member at various locations along its length, e.g., toward the top, middle and/or bottom of the barrier member.

Figure 2:
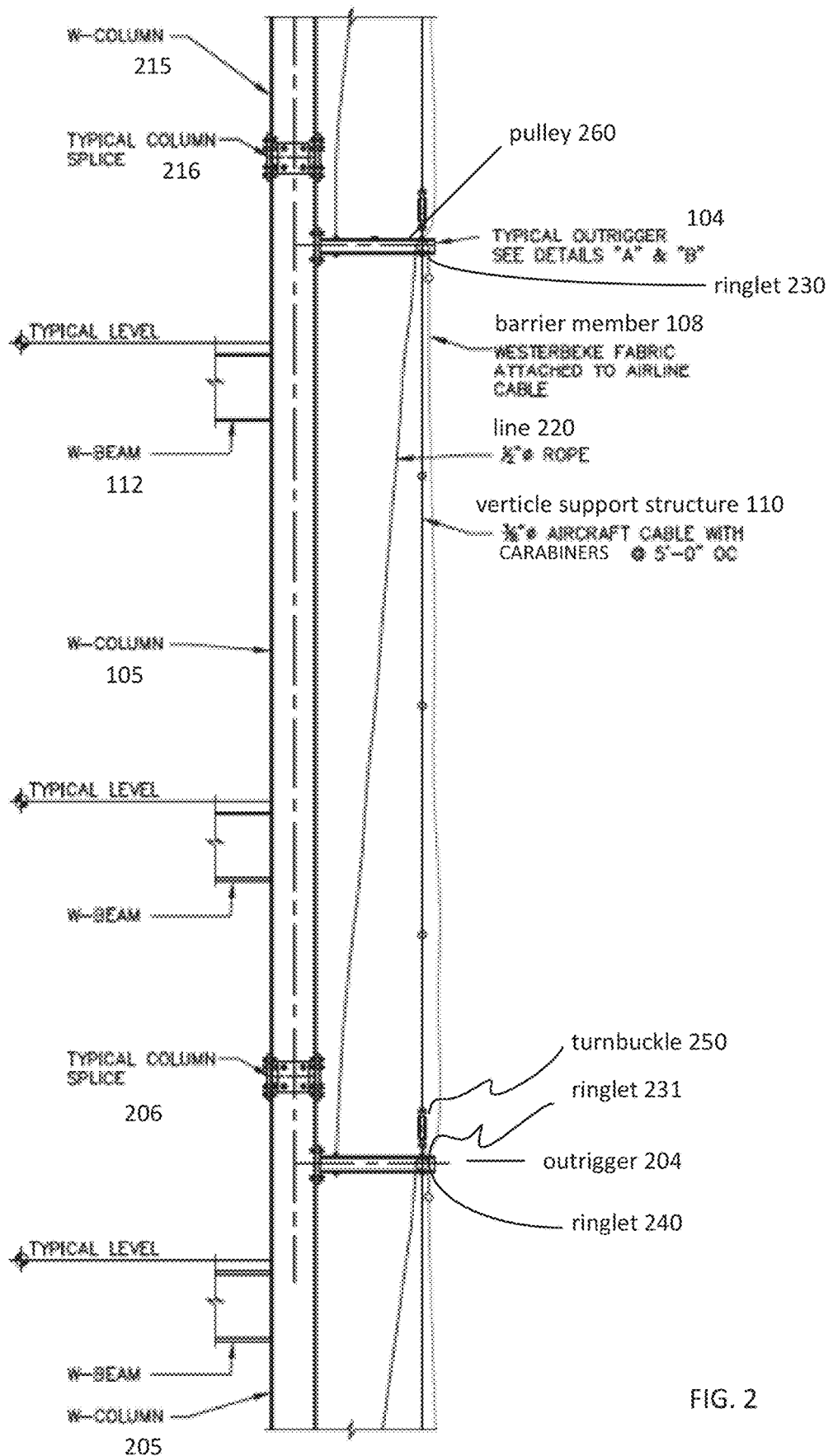
FIG. 2 is a schematic diagram showing a side view of the column 105 with outrigger 104 from FIG. 1, in accordance with one exemplary embodiment.

FIG. 2 is a schematic diagram showing a side view of the column 105 with outrigger 104 from FIG. 1, in accordance with one exemplary embodiment. Here, the column 105 with outrigger 104 is installed via a typical column splice 206 on a lower-level column 205 having an outrigger 204 and also supports via a typical column splice 216 an upper-level column 215 having an outrigger (not shown for convenience). Each column section has essentially the same components. The outrigger 104 on column 105 includes an elongated body with a mounting plate at the proximal end of the elongated body and a pulley 260 at the distal end of the elongated body through which line 220 passes. Line 220 would have been used to lift barrier member 208 into place, and now supports the top corner of the barrier member 208 with the other end of the line attached to ringlet 240 on the outrigger 204 on lower-level column 205. The vertical support structure 110 (here, an aircraft cable) is attached at its top end to ringlet 230 on the bottom side of outrigger 104 and is attached at its bottom end to ringlet 231 on the outrigger 204 on lower-level column 205. Turnbuckle 250 is used to tighten the vertical support structure 110 so it is taut and able to support the side of the barrier member 108. The side edge of the barrier member 108 includes grommets (e.g., every 2 feet on center) through which carabiners or other fasteners are used to secure the side edge of the barrier member 108 to the vertical support structure 110. The return portion of the barrier member 108 is attached back into the building at or about the outrigger 204 (not visible in this side view). It should be noted that the outrigger 104 is used to support the line and vertical support structure components from the upper-level column 215 and its outrigger.

Figure 3:
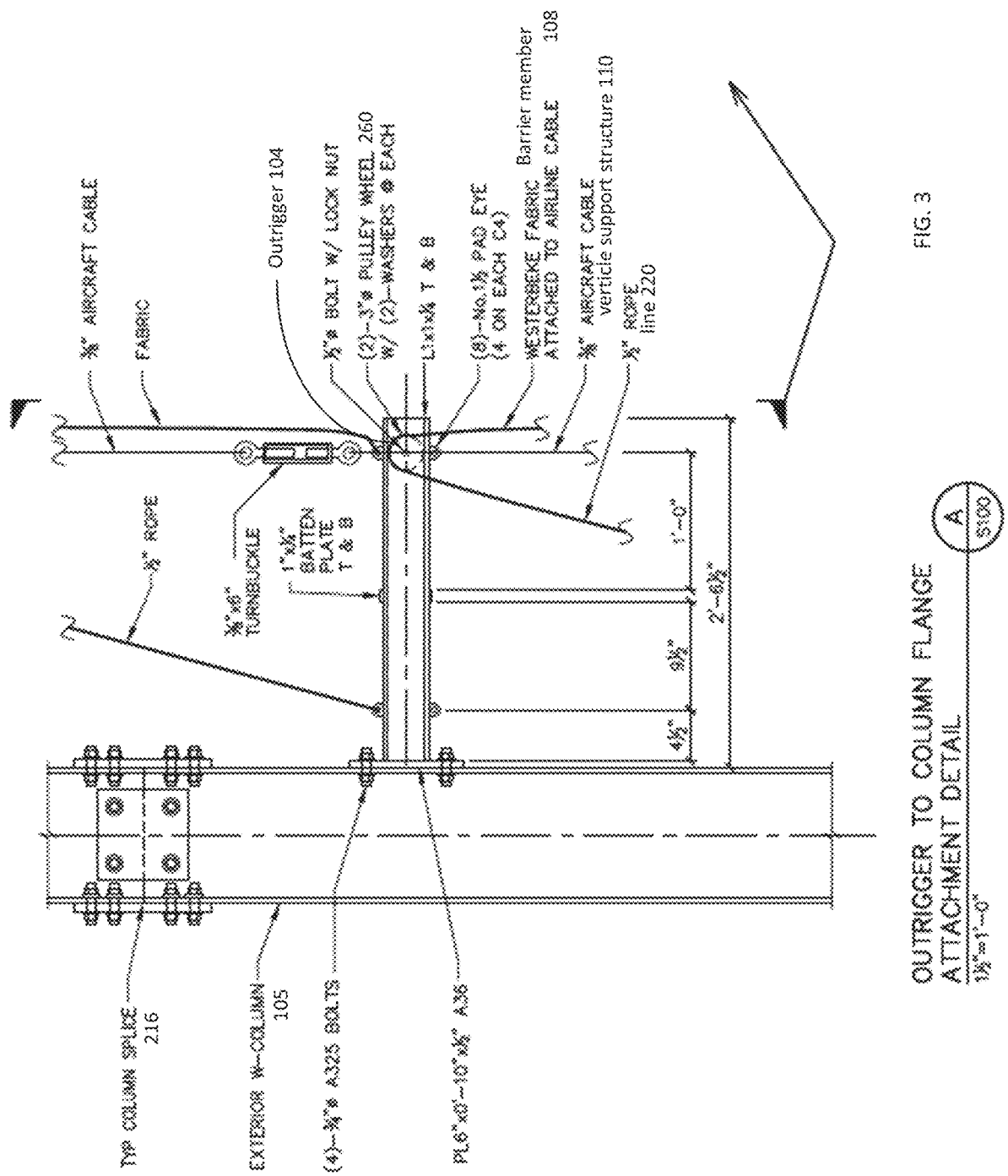
FIG. 3 is a schematic diagram showing a detailed side view of the structures of FIG. 2 with the outrigger 104 attached to the flange of column 105, in accordance with one exemplary embodiment.

FIG. 3 is a schematic diagram showing a detailed side view of the structures of FIG. 2 with the outrigger 104 attached to the flange of column 105, in accordance with one exemplary embodiment.

Figure 4:
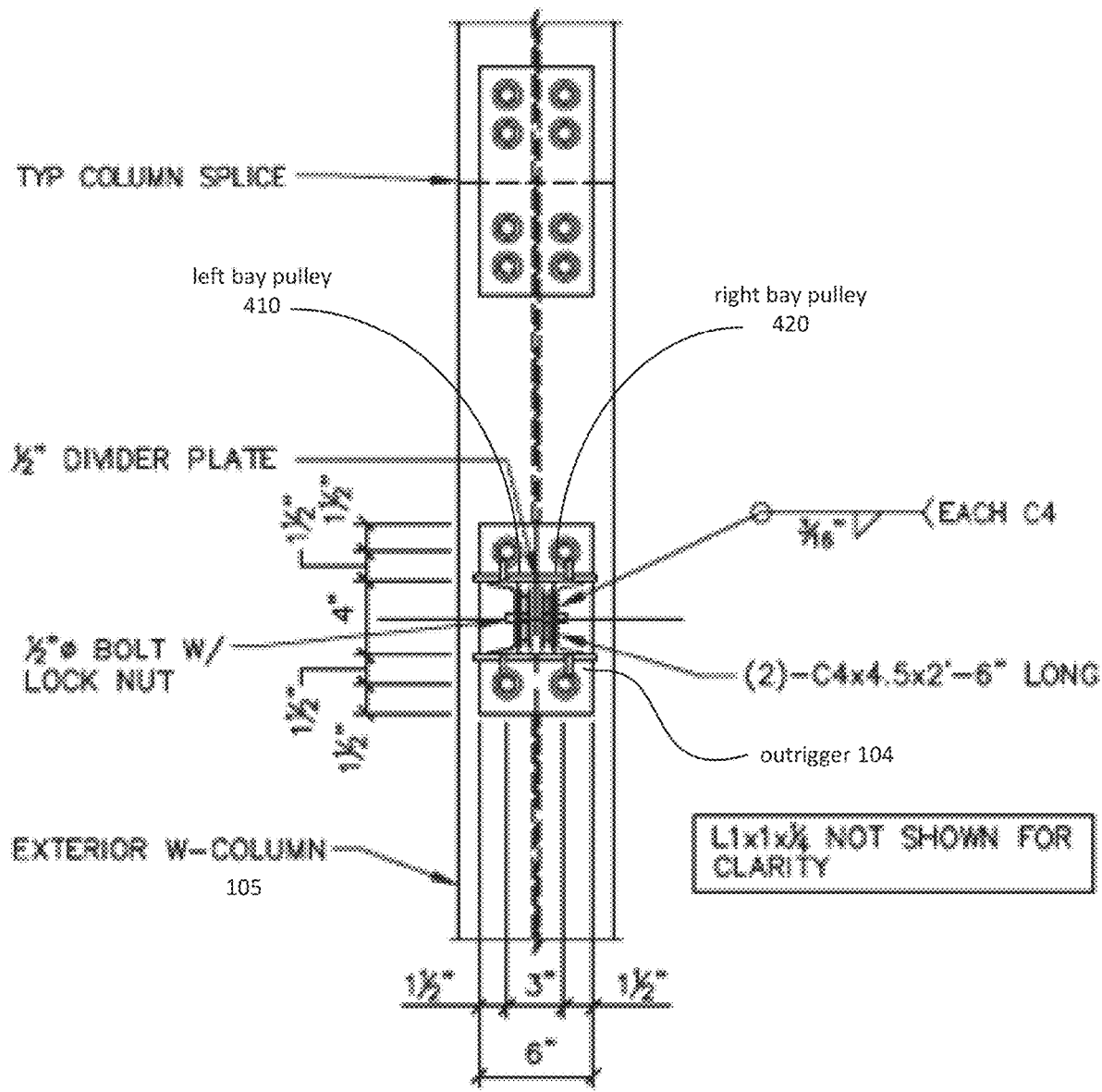
FIG. 4 is a schematic diagram showing a detailed front view of the structures of FIG. 3, in accordance with one exemplary embodiment.

FIG. 4 is a schematic diagram showing a detailed front view of the structures of FIG. 3, in accordance with one exemplary embodiment. Note here the pulley system having two pulleys, one pulley 410 for lifting and supporting the barrier member for the bay to the left of the outrigger 104 and the other pulley 420 for lifting and supporting the barrier member for the bay to the right of the outrigger 105.

Figure 5:
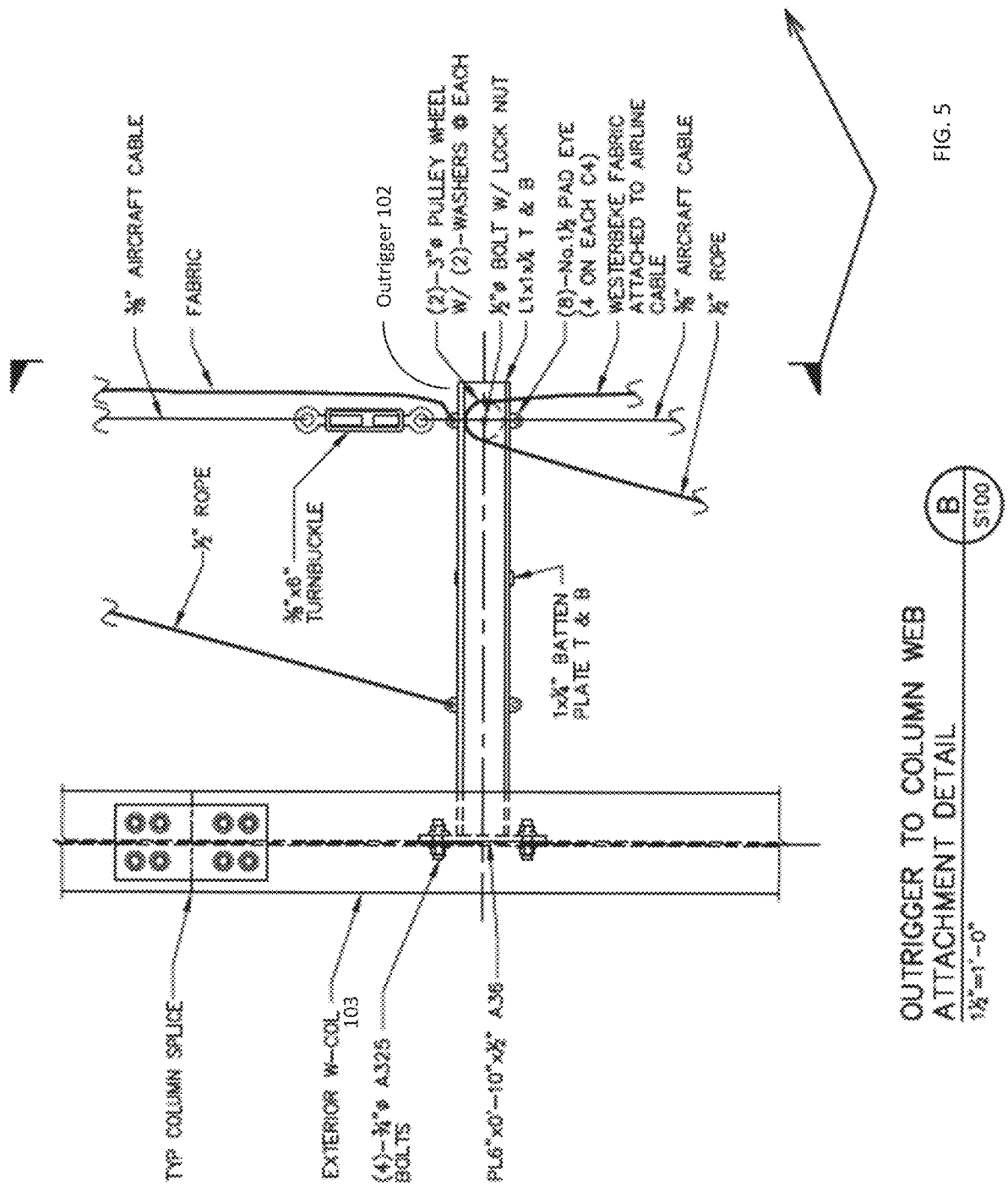
FIG. 5 is a schematic diagram showing a detailed side view of an outrigger attached to the web of a column such as outrigger 102 attached to column 103, in accordance with one exemplary embodiment.

FIG. 5 is a schematic diagram showing a detailed side view of an outrigger attached to the web of a column such as outrigger 102 attached to column 103, in accordance with one exemplary embodiment.

Figure 6:
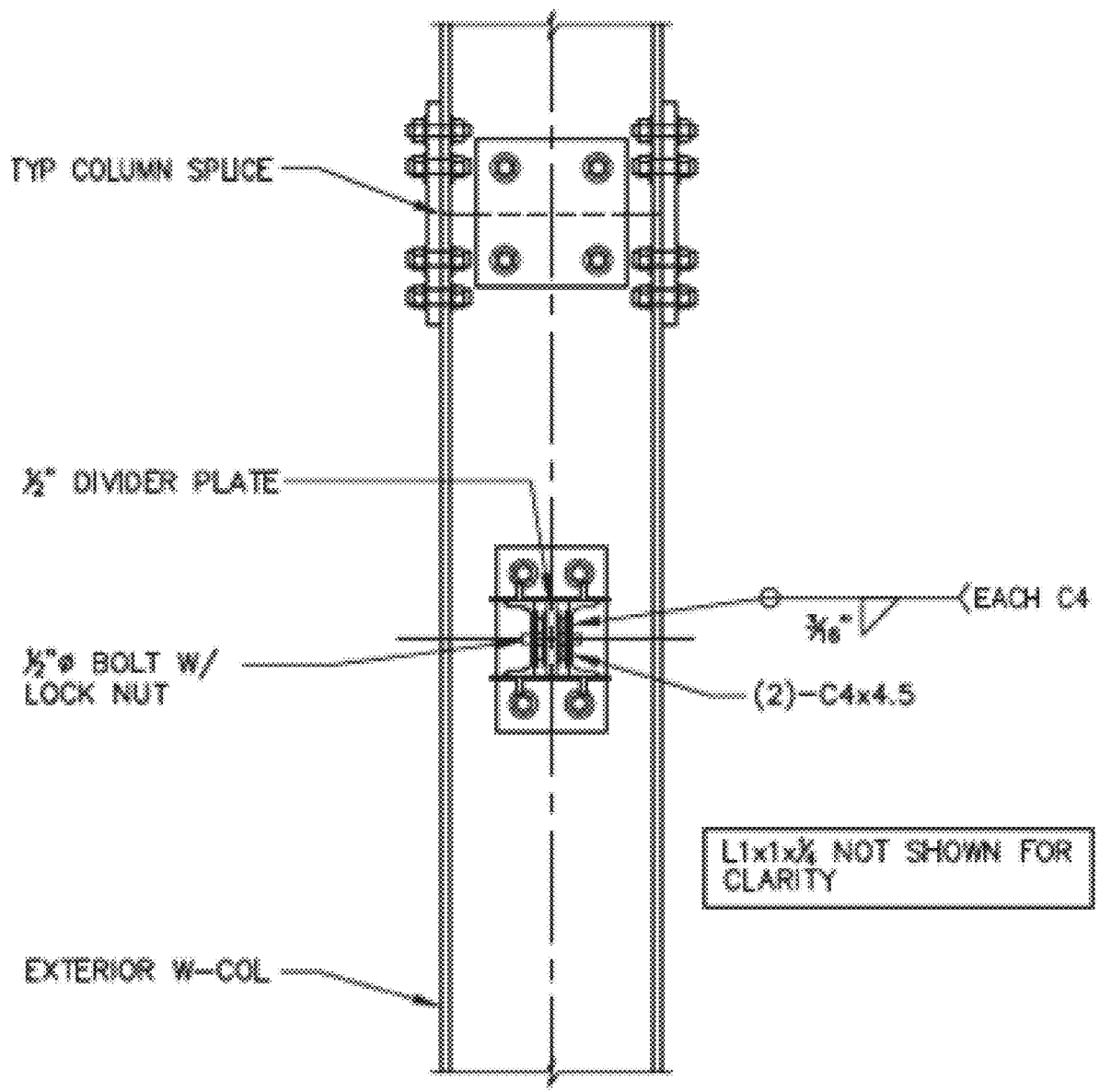
FIG. 6 is a schematic diagram showing a detailed front view of the structures of FIG. 5, in accordance with one exemplary embodiment.

FIG. 6 is a schematic diagram showing a detailed front view of the structures of FIG. 5, in accordance with one exemplary embodiment.

Figure 7:
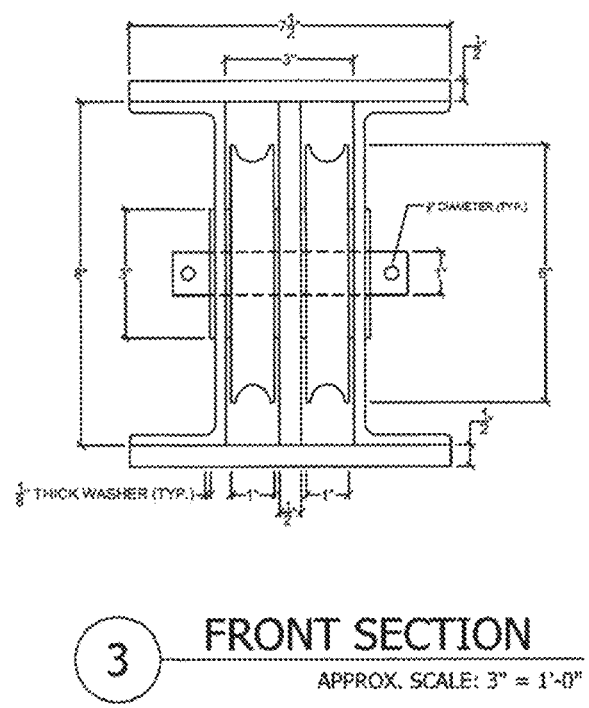
FIG. 7 is a schematic diagram showing a detailed top view of the pulley system, in accordance with one exemplary embodiment.

FIG. 7 is a schematic diagram showing a detailed top view of the pulley system, in accordance with one exemplary embodiment.

Figure 8:
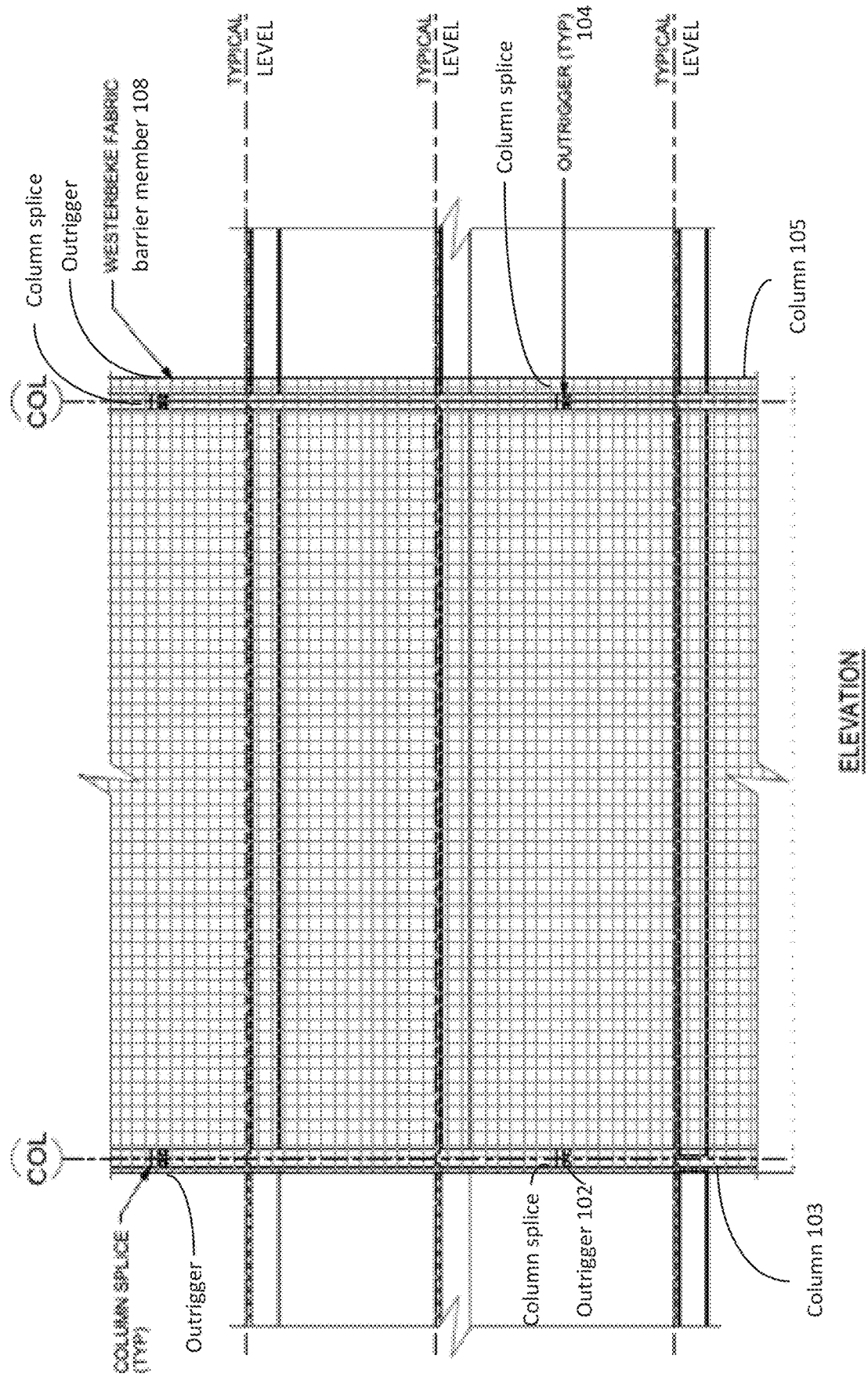
FIG. 8 is a schematic diagram showing a side view of the portion of the building shown in FIG. 1, in accordance with one exemplary embodiment.

FIG. 8 is a schematic diagram showing a side view of the portion of the building shown in FIG. 1, in accordance with one exemplary embodiment. In this exemplary embodiment, channel units are installed around the building at predetermined locations and are designed to be installed every two levels. The barrier members are installed side by side using the additional sets of cables and lines on the units, thereby creating a wall of debris containment barriers.

Figure 9:
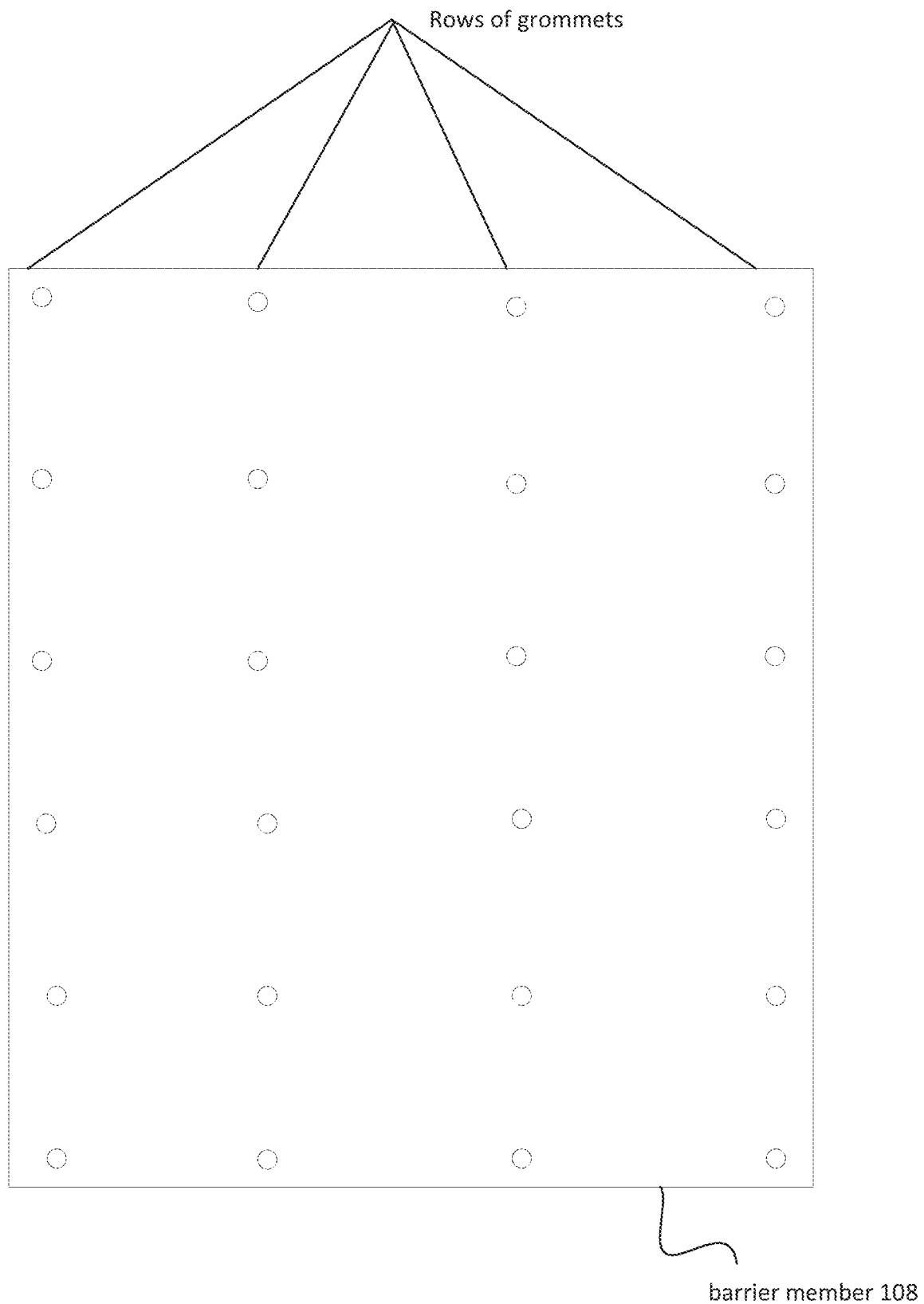
FIG. 9 is a schematic diagram showing a barrier member having multiple rows of grommets, in accordance with one exemplary embodiment.

While the barrier member is described above as having a row of grommets of other attachment features along the two side edges of the barrier member by which the edges of the barrier member can be attached to the vertical support structures, barrier members could have multiple rows of grommets or other attachment features so that the barrier members can be used in bays of different widths. FIG. 9 is a schematic diagram showing a barrier member having multiple rows of grommets, in accordance with one exemplary embodiment. In this example, the barrier member includes four rows of grommets, although embodiments can include two, three, four, or more rows of grommets arranged for bays of different widths and/or for accommodating additional supports, as discussed below.

In various alternative embodiments, additional supports (e.g., additional channel units, brackets, or other supports) may be used for lifting and/or supporting the barrier member at any of various places along its length or width such as at the top, bottom, sides, and/or elsewhere. For example, additional supports may be placed at the half, thirds, or quarters points along a horizontal or vertical portion of the barrier member. In some cases, additional supports may attach to structural members (e.g., columns or beams), safety stanchions, or other structures on the building.

In order to remove channel units at a given level of the building, the barrier member typically would be disconnected from the vertical support structures holding each side of the barrier member, after which the vertical support structures can be disconnected from the supporting channel units. Then, the lines holding the top corners of the barrier member typically would be disconnected from the supporting channel units and used to lower the barrier member to the ground or to a lower floor manually or mechanically while still being supported through the pulleys of the upper-level channel units through which the barrier member was initially lifted. The channel units can then be unbolted or otherwise disconnected from the structural members. The channel units can be supported during this removal process by reconnecting the ends of the lines used to lower the barrier member back onto to the channel units so that the channel units can be supported via the line from the ground or lower floor.

As mentioned above, barrier members may be lifted and/or lowered mechanically, e.g., using cranks or winches. A crank or winch typically would not be a permanent part of each channel unit but instead typically would be couplable to the channel unit or elsewhere (e.g., to the building, or used from the ground or lower-level floor) and removable/portable for use in lifting and/or lowering other barrier members.

It should be noted that channel units can be produced in different configurations, e.g., different lengths, materials, gauges/thicknesses, structures/cross-sections, etc., as needed or desired for a specific implementation. Different configurations may be designed for different mechanical or environmental specifications, e.g., length, strength/weight capacity, weather concerns, etc. Channel units of different lengths may be produced using different gauges/thicknesses of material to compensate for different mechanical loads. Channel units can be produced with additional supports/bracing, such as for example, an angle brace to support the horizontal channel unit element with the angle brace possibly having its own mounting plate to attach to the structural member (e.g., column or beam) at a second location.

It should be noted that even though channel units are described above as having pulleys to support the lines used to lift and support the barrier member, alternative embodiments could use other mechanisms to support the line such as, for example, a bar or channel over which the line slides or a hole through which the line slides. In certain exemplary embodiments, the line supports are separated, e.g., by a center guide, in order to reduce or eliminate the chances of a line from one guide jumping out of the guide, which could cause the line to get stuck or tangle.

It should be noted that channel units can be fabricated from any appropriate material, such as, for example, steel or aluminum. In certain exemplary embodiments, the channel units are fabricated in a symmetrical configuration so that the installer does not have to distinguish between a top and a bottom of the channel unit when installing the channel unit. Among other things, this should facilitate installation, reduce installation time, and avoid issues with mis-oriented channel units.

It should be noted that channel units can be fabricated to be adjustable in length so that channel units can be used to meet a variety of length requirements or to allow for on-site length adjustment needed to ensure that the channel units extend an equal distance from the building perimeter. For example, channel units can include a telescoping or other adjustable mechanism for adjusting the length of the channel unit.

It should be noted that even though exemplary embodiments use bolts to attach channel units through holes fabricated in the structural members, other attachment mechanisms may be used in various alternative embodiments such as, for example, clamps or U-bolts that can attach the channel unit onto the structural member. Such attachment mechanisms might be structurally weaker than bolts through holes fabricated in the structural members, although it could reduce fabrication costs by omitting the need to fabricate holes in the structural members.

Without limitation, the following is an overview of some typical fabrication and installation processes as envisioned by the inventor, in accordance with one exemplary embodiment:

1. Once awarded a steel project, work closely with the selected steel fabricator to determine the placement of the channel units for the specifics of the project.

2. Provide the fabricator with the engineered designs of the channel units that are needed for the system to incorporate into the fabrication of the perimeter structural members (e.g., columns and/or beams).

3. The fabricator will detail each specifically called out structural member where the channel unit is needed with the bolt pattern fabricated on the structural member. In exemplary embodiments, this will consist of four bolt holes on the face/web of the structural member at the predetermined location.

4. The system will be designed for the total length of the columns (which, in exemplary embodiments, is assumed to be two-story columns for each erection tier).

5. Each exterior column generally will have one prefabricated channel unit that will need to be bolted onto the face of column prior to erection. The pre-fabricated channel unit will be installed 1' below the column splice in exemplary embodiments, although other locations may be used in other embodiments.

6. The structural members will be off-loaded from the delivery truck to the laydown area with the bolt holes for the channel units facing up.

7. Pre-fabricated outriggers will be delivered or already on-site for hand installation on the ground (e.g., inside the laydown area) to the off-loaded structural members. In exemplary embodiments, each channel unit will have pad eyes welded to the front of the outriggers for individual guideline attachments. The guidelines will be attached by the ironworkers in the laydown yard. No crane time will be needed for the installation of the channel units to the structural members.

8. In exemplary embodiments, the guidelines will be a ⅜" cable, the length of the column, attached to the underside front pad eye of the channel unit and terminated using three Crosby clips prior to setting column. Once the column is erected, the cable will be drawn up tight using a ⅜" turnbuckle that will be attached to the front pad eye at the top of the previously-attached lower-level channel unit using a ⅜" Crosby shackle.

9. Once the column is dressed with prefabricated channel units and the guideline attached to the underside front pad eye, a ½" polypropylene rope will be attached through the 3" pully system into the outriggers. (Each channel unit will have two 3-inch pully devices in the middle of the channel unit by way of a ½ bolt with a lock nut). The rope will go from the top channel unit, through the pully, down to the base of the column (preferably 2 feet up from the base of column). The extra length of the rope will be secured, e.g., 2 feet up from the base of the column, by means of tie wire or similar.

10. After the column is 100% dressed in all the components, then the column can be hoisted into place and erected as normal.

11. Once enough columns are set, trained ironworkers will start installing the barrier members.

12. The installation gang (generally 1 Forman and 3 Ironworkers) will start to attach the ⅜" cable to the already attached channel unit on the previously erected column.

Without limitation, the following is an overview of installing the cable to the channel unit as envisioned by the inventor, in accordance with one exemplary embodiment:

1. First, the ironworkers will set up their personal safety lines (Sala Lines) that run from column to column where the barrier members will be installed.

2. The installation gang will set up safety from column to column using Sala Lines for tie off while installing the cables from inside the perimeter cables working off the previously decked floor.

3. The ⅜" cable will attach to the ⅜" turnbuckle that will be attached to the channel unit using a ⅜" shackle.

4. One the cable is attached to the turnbuckle and terminated using 3 Crosby clips, 1 ironworker will tighten up the turnbuckle to get the cable taught.

5. After the cable is taught, then the ironworker will undo the ½" rope from the column and prepare the rope to hook onto the perimeter net.

Without limitation, the following is an overview of installing the net to the ⅜" cable by way of the ½" rope as envisioned by the inventor, in accordance with one exemplary embodiment:

1. The nets will be hoisted to the floors, in a scale pan and off loaded to decking.

2. The nets will be pre-fabricated to accommodate individual bay sizes.

3. The nets will then be laid out in between each column on the decked floor inside the perimeter cables.

4. The installation gang will be at each location.

5. The ½" rope (with a pre-fabricated hook attached to the working end) will then be attached to the top corner of the net (One rope per corner of net).

6. There will be two ironworkers at each column. One ironworker will be hoisting the net, standing inside the perimeter of the building, using the rope with the previously attached hooks. Another ironworker will be attaching the net, by means of carabiner clips that are already pre-attached to the net, clipping them onto the ⅜" guide-line, while the net is being hoisted into place by the ironworker.

7. Each column will have two ironworkers working the installation simultaneously.

8. This process will continue to the top of the column channel units. Once all the carabiners are attached to the guideline and the net is pulled up to full height, the rope will then be pulled taught, through the back-pad eye and terminated at this location. The net then may be attached to the lower-level outriggers, e.g., to ringlets on the bottom of the outriggers via carabiners run through grommets at the edge of the net adjacent to the outriggers.

9. This process will need to occur at both column lines at the same time to ensure an even smooth install.

It should be noted that it may be possible for one ironworker rather than two ironworkers to be positioned at each column during the above installation process. For example, a single worker could hoist the net to expose the next grommet, temporarily secure the rope to hold the net in place, and attach the net to the guideline at the exposed grommet, and repeat this process until the net is completely hoisted and secured. A crank or winch could be provided, e.g., on the outrigger or via a portable unit on the bay floor, to assist or perform the hoisting such as for single worker operation.

Some additional details and options are now described.

As discussed above, in exemplary embodiments, the bottom of the barrier member includes a return portion (e.g., essentially an extended portion of material, e.g., 3 feet of material) that is attached back into the building in order to bridge the gap that otherwise would exist between the bottom of the barrier member and the building and prevent debris from falling down between that gap. Typically, each floor of the building has safety stanchions that hold two lines, as required by OSHA for perimeter safety. In certain exemplary embodiments, the return portion of the barrier member would be attached to the existing safety stanchions or to a third line added to these existing safety stanchions, e.g., using carabiners or other fasteners that attach to the return portion of the barrier member (e.g., through a row of grommets placed along the bottom edge of the barrier member) and to the safety stanchions or to the third line supported by the safety stanchions.

Figure 10:
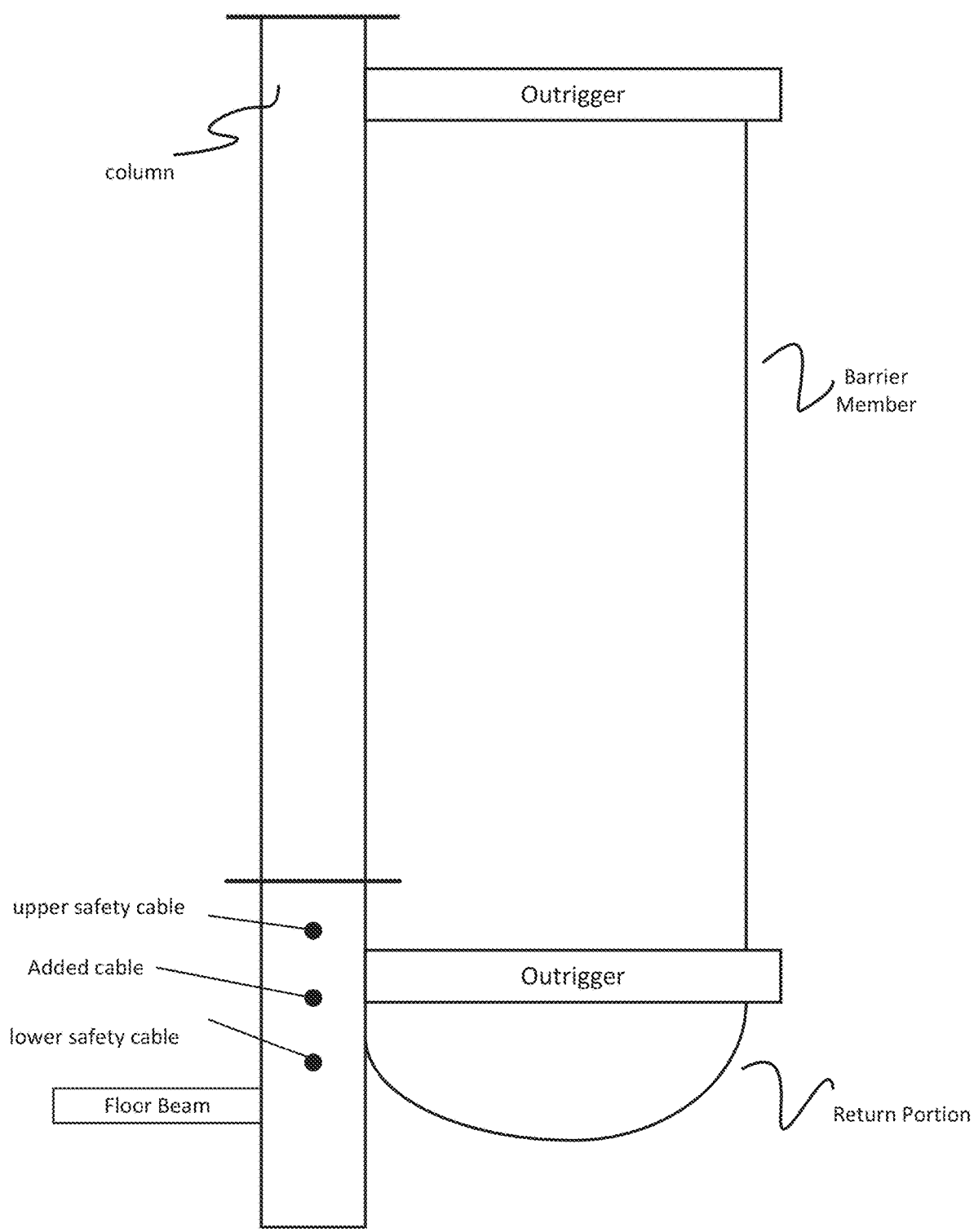
FIG. 10 is a schematic diagram showing a side view of a barrier member with a return portion attached to a third line added between the two existing safety cables, in accordance with one exemplary embodiment.

FIG. 10 is a schematic diagram showing a side view of a barrier member with a return portion attached to a third line added between the two existing safety cables, in accordance with one exemplary embodiment. It should be noted that in some cases, the return portion could be attached to the upper or lower safety cable or secured in another way, rather than adding a third cable. However, the inventor considers the addition of a third cable as a preferred approach because it does not jeopardize the integrity of the other safety cables, which generally are mandated by law and which could be deflected outward by the weight of the return portion.

Figure 11:
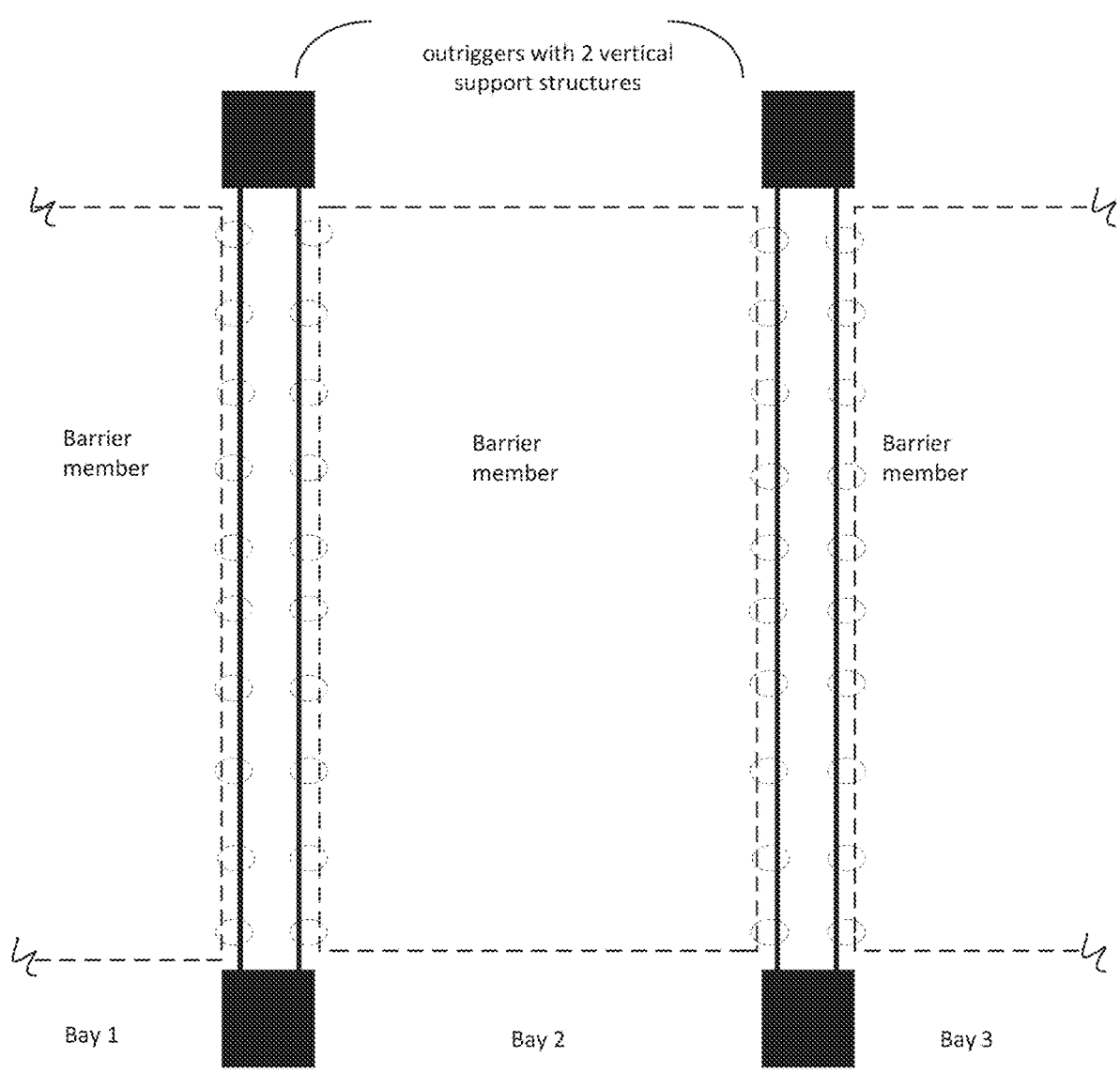
FIG. 11 is a schematic diagram showing a front view of adjacent barrier members installed in three adjacent bays, in accordance with one exemplary embodiment.

FIG. 11 is a schematic diagram showing a front view of adjacent barrier members installed in three adjacent bays, in accordance with one exemplary embodiment. As discussed above, in certain exemplary embodiments, there are two vertical support structures 110 extending between two vertically-adjacent outriggers. In this example, each barrier member is attached to the inner vertical support structures, i.e., the vertical support structures closest to its own bay. For example, as shown, the right edge of the Bay 1 barrier member is attached to the vertical support structure closest to Bay 1, the left and right edges of the Bay 2 barrier member are attached to the vertical support structures closest to Bay 2, and the left edge of the Bay 3 barrier member is attached to the vertical support structure closest to Bay 3.

Figure 12:
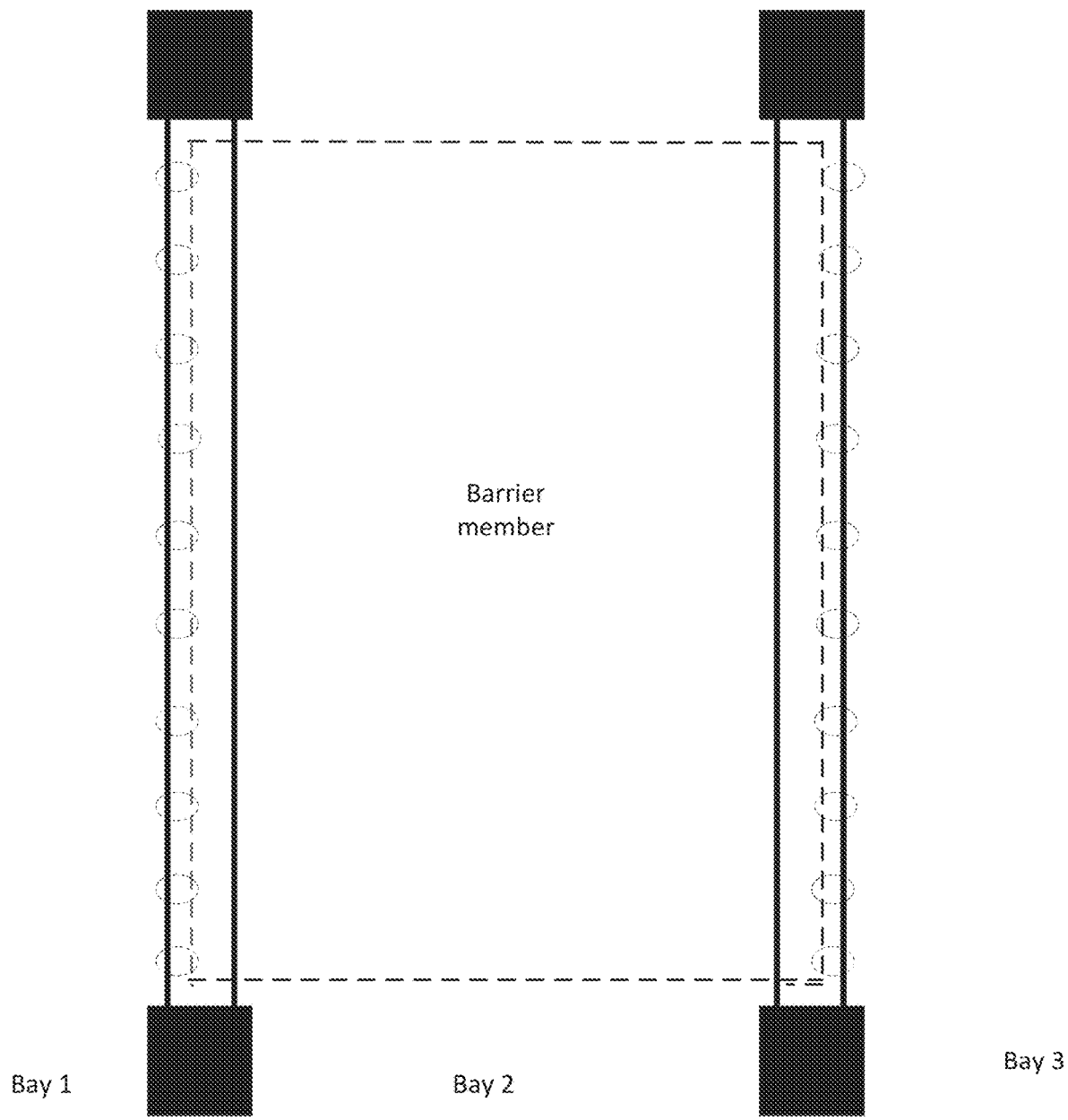
FIG. 12 is a schematic diagram showing the Bay 2 barrier member attached to the outer vertical support structures, in accordance with one exemplary embodiment.
Figure 13:
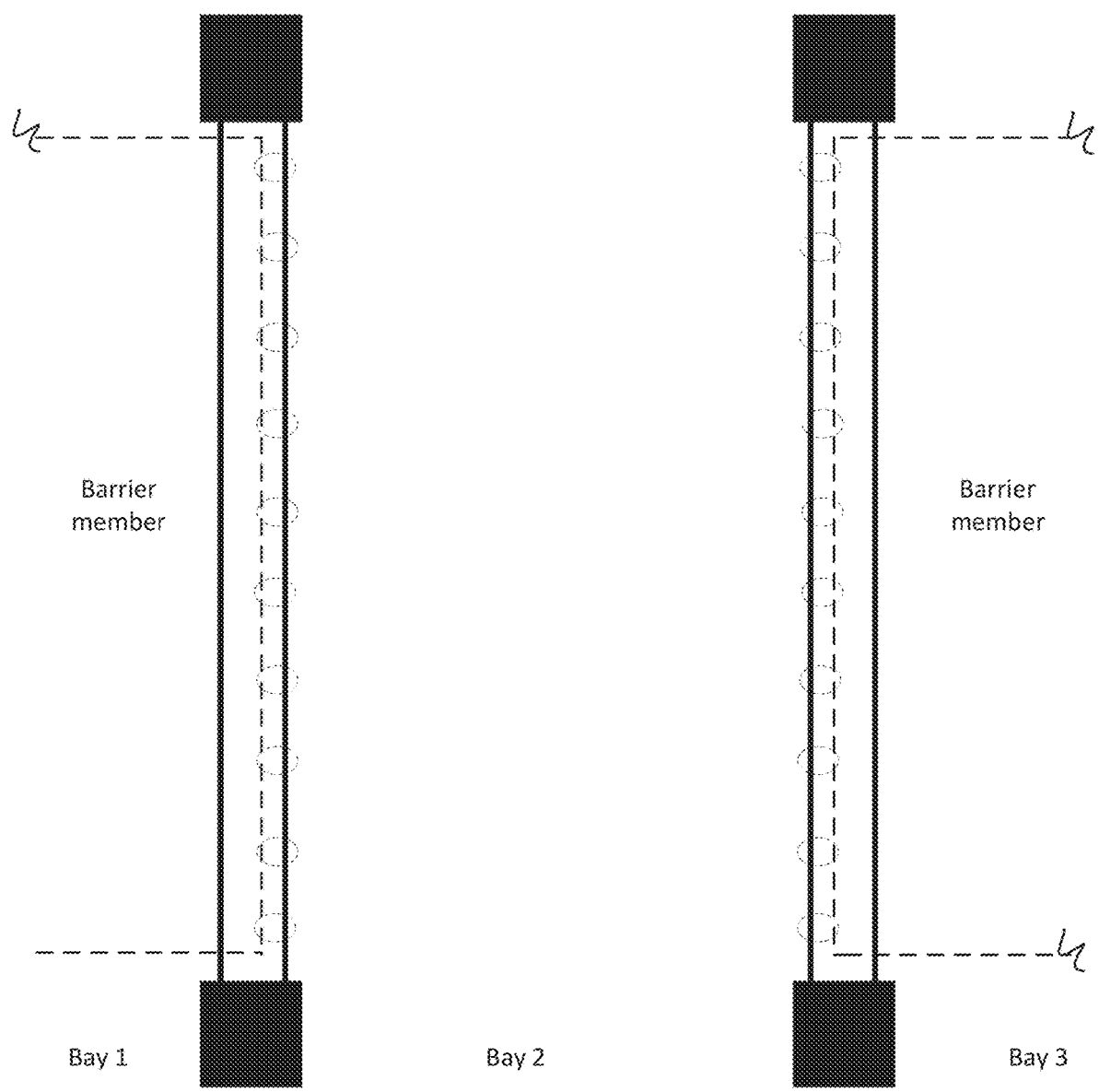
FIG. 13 is a schematic diagram showing the Bay 1 and Bay 3 barrier members attached to respective outer vertical support structures, in accordance with one exemplary embodiment.
Figure 21:
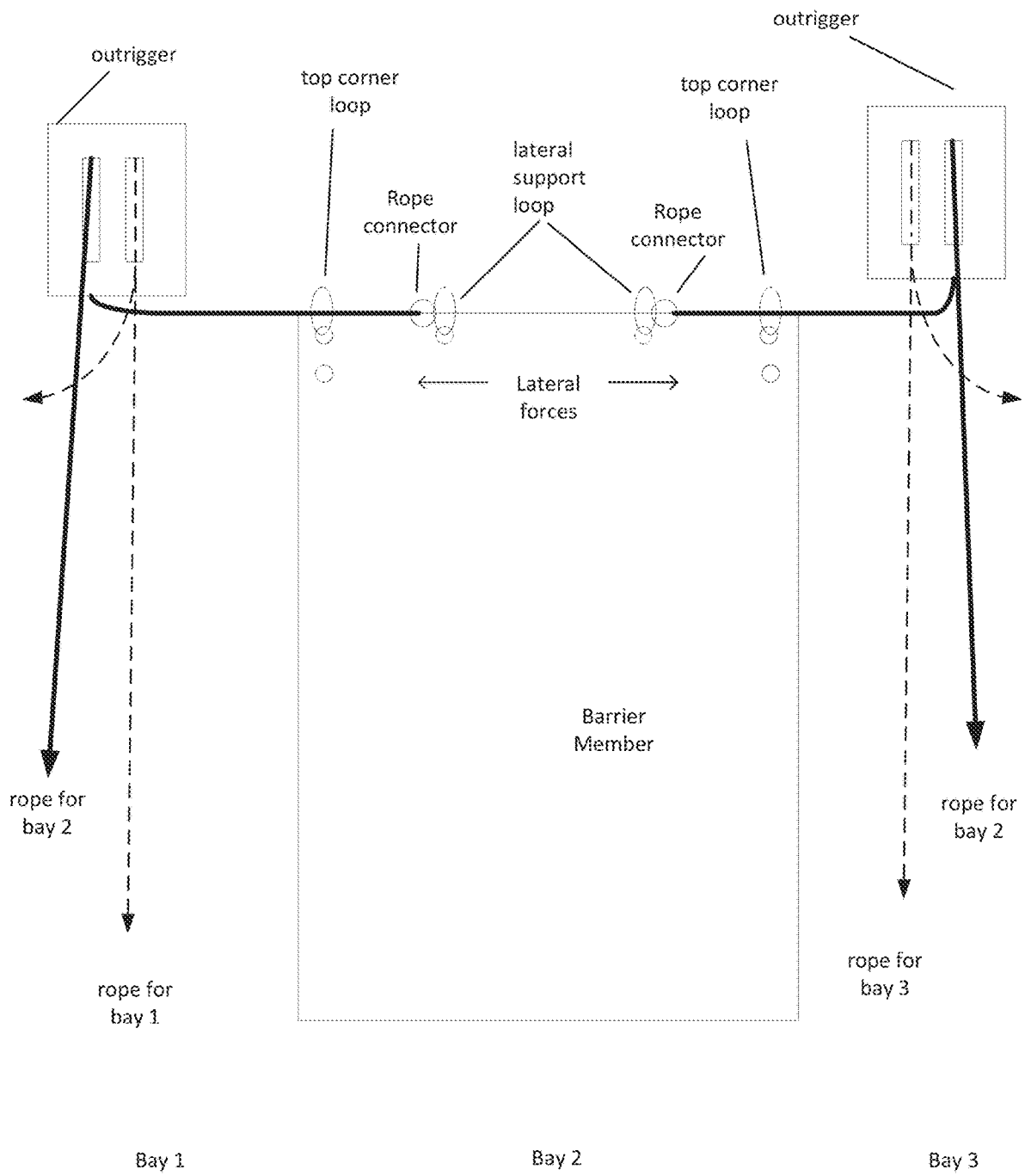
FIG. 21 is a schematic diagram showing a special configuration used to support the top of the barrier member such that the top edge is pulled laterally from each top corner, in accordance with one exemplary embodiment.

One potential issue with the configuration shown in FIG. 11 is that it can leave significant gaps between the adjacent barrier members. Thus, in certain exemplary embodiments, the barrier members are attached instead to the outer vertical support structures. FIG. 12 is a schematic diagram showing the Bay 2 barrier member attached to the outer vertical support structures, in accordance with one exemplary embodiment. FIG. 13 is a schematic diagram showing the Bay 1 and Bay 3 barrier members attached to respective outer vertical support structures, in accordance with one exemplary embodiment. In an exemplary embodiment, if the Bay 1, Bay 2, and Bay 3 barrier members were installed in that order, then the Bay 1 barrier member would be hoisted and attached as shown in FIG. 13, the Bay 2 barrier member then would be hoisted and attached as shown in FIG. 12, and the Bay 3 barrier member then would be hoisted and attached as shown in FIG. 13. It will be appreciated that this configuration can cause some amount of overlap between the edges of adjacent barrier members. In certain exemplary embodiments, in addition to attaching the barrier member to the outer vertical support members, the barrier member is also raised using the outer pulley or guide, as depicted in FIG. 21 discussed below.

Figure 14:
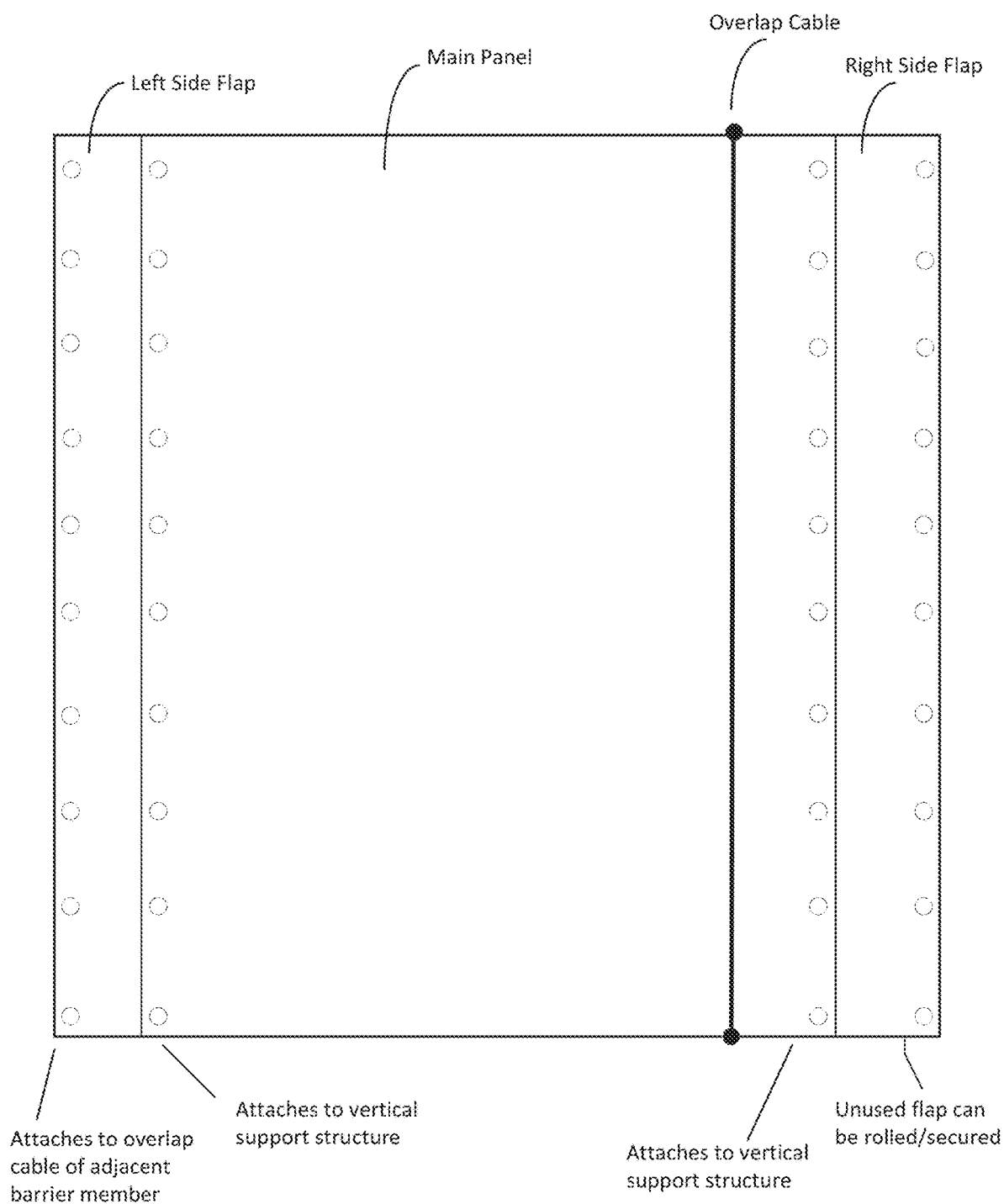
FIG. 14 is a schematic diagram showing a barrier member with side flaps and overlap cable, in accordance with one exemplary embodiment.

In the configuration shown and described with reference to FIGS. 12 and 13, gaps between the adjacent barrier members can be reduced or in some cases eliminated compared to the configuration shown in FIG. 11. However, in certain exemplary embodiments, some small gaps can still exist due to deflection of the barrier member between grommets as the barrier member is stretched and attached. Therefore, in certain exemplary embodiments, a side flap of material is added to one or both side edges of the barrier member for attachment to an adjacent barrier member to bridge the gap between the adjacent barrier members. FIG. 14 is a schematic diagram showing a barrier member with side flaps and overlap cable, in accordance with one exemplary embodiment. Here, the barrier member includes the main barrier member panel that attaches at each edge to a corresponding vertical support structure, and also includes left and right side flaps and an overlap cable inboard of one edge of the main panel edge. In this example, the overlap cable is inboard approximately 2 feet from the right side main panel edge, such that the left side panel of the barrier member to the right can be attached to the overlap cable.

Figure 15:
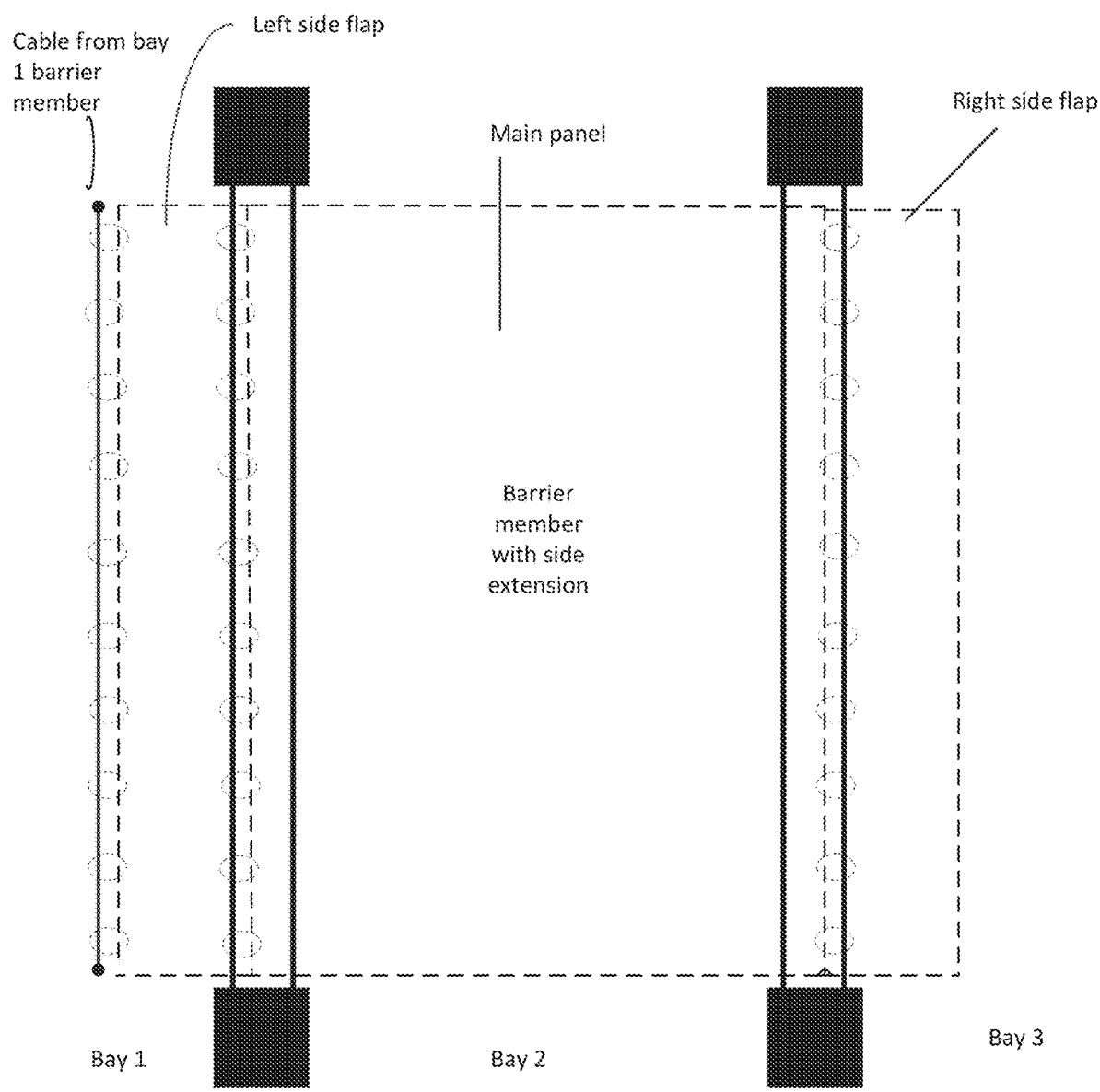
FIG. 15 is a schematic diagram showing a barrier member of the type shown in FIG. 14 installed such that the edges of the main barrier member panel is attached to the corresponding vertical support structures and the left side panel is attached to the overlap cable of the barrier member to its left, i.e., the overlap cable of the Bay 1 barrier member.

FIG. 15 is a schematic diagram showing a barrier member of the type shown in FIG. 14 installed such that the edges of the main barrier member panel is attached to the corresponding vertical support structures and the left side panel is attached to the overlap cable of the barrier member to its left, i.e., the overlap cable of the Bay 1 barrier member. It should be noted that overlap cables may be placed on both sides of the barrier member to all for connection to one, the other, or both adjacent barrier members. It also should be noted that, when using side flaps, the barrier members may be attached to the inner vertical support structures rather than to the outer vertical support structures because the large gap will be covered by the side flap.

Figure 16:
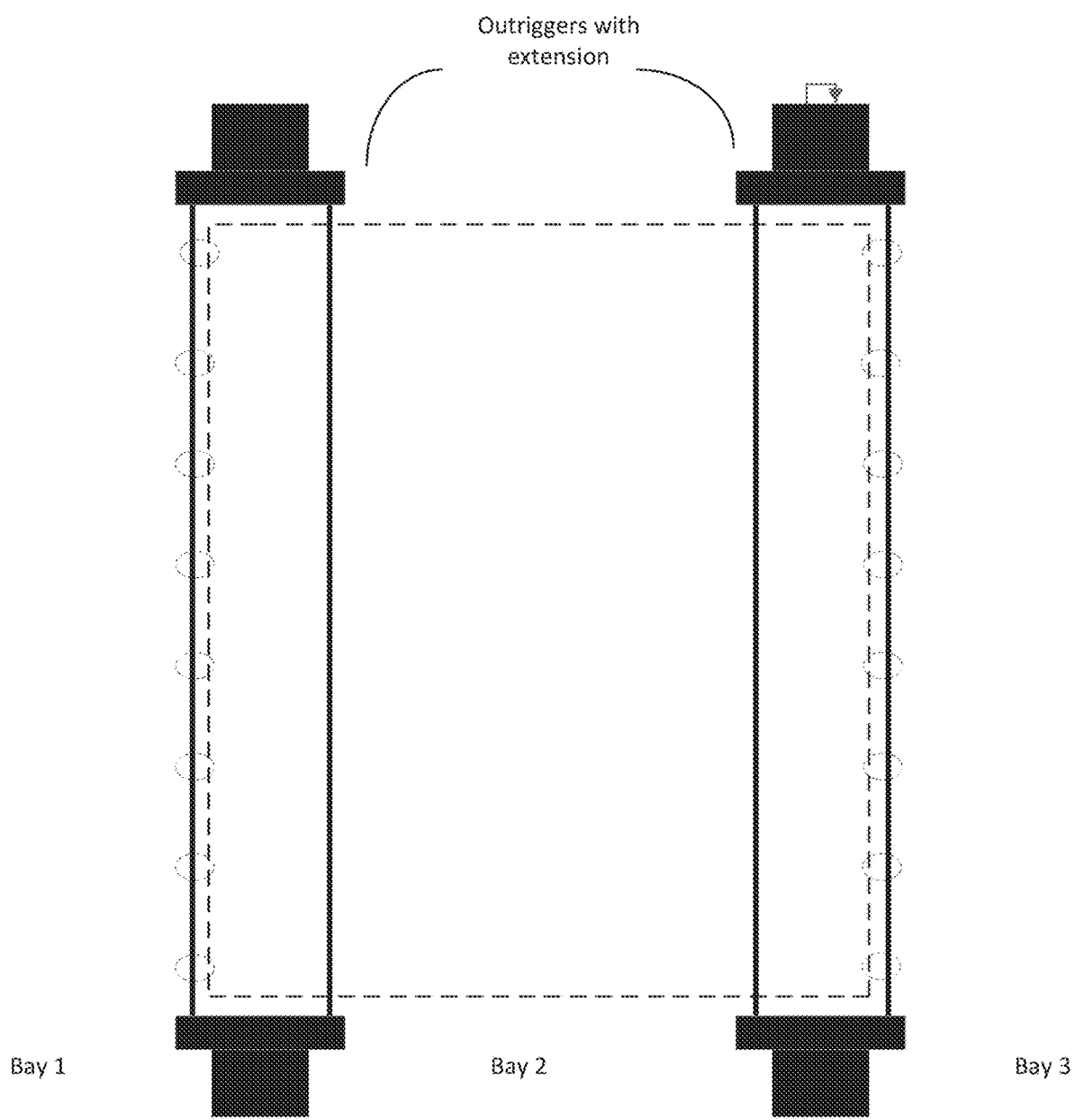
FIG. 16 is a schematic diagram showing outrigger with an extension that holds the vertical support structures farther apart, in accordance with one exemplary embodiment.
Figure 17:
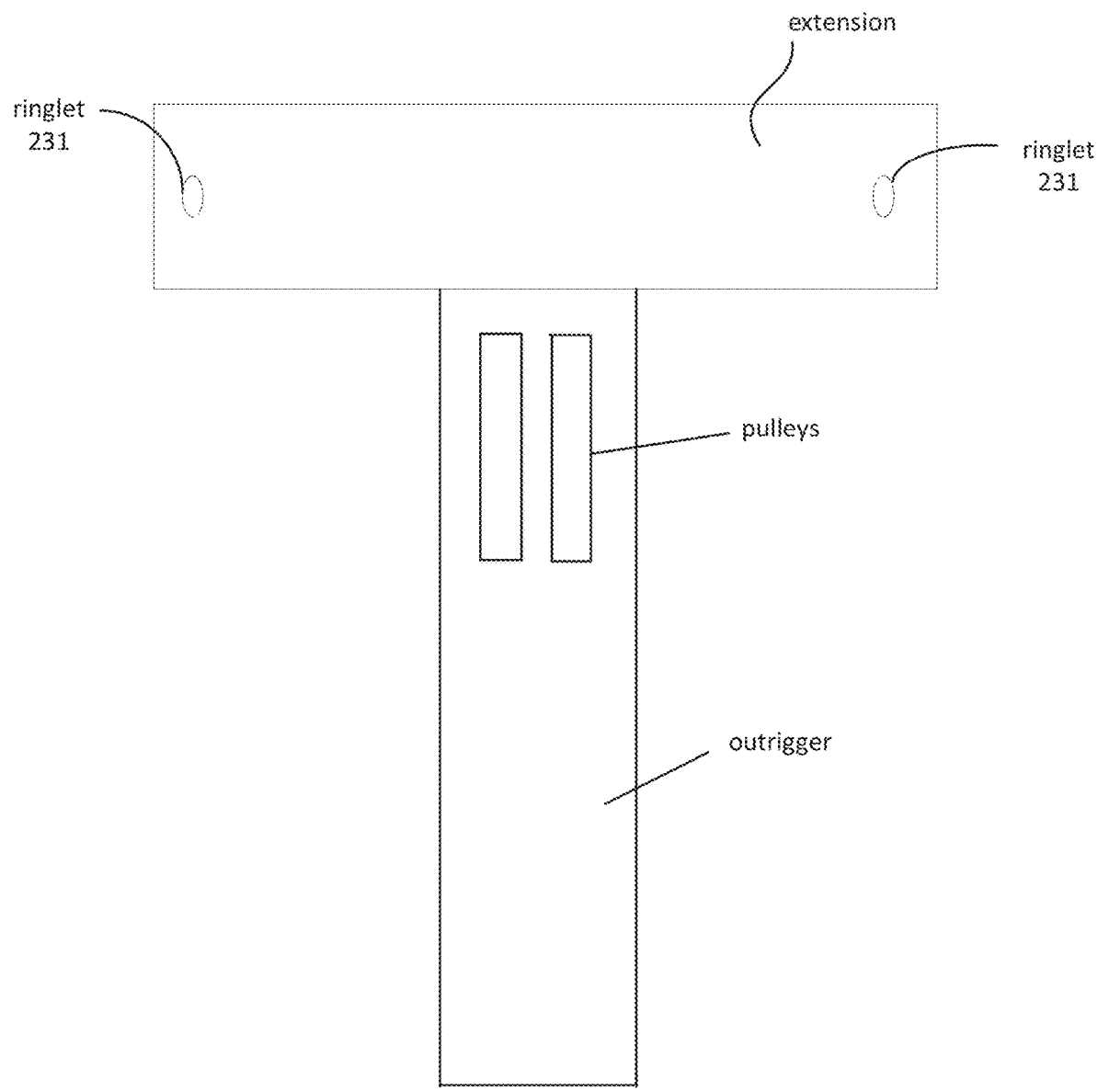
FIG. 17 is a schematic diagram showing a top view of an outrigger with extension, in accordance with one exemplary embodiment.

Additionally or alternatively, gaps between adjacent barrier members can be bridged by increasing the distance between the vertical support structures at each outrigger so that overlapping attachment as shown and described above with reference to FIGS. 12 and 13 will bridge the gap, preferably without the need for added side panels. FIG. 16 is a schematic diagram showing outrigger with an extension that holds the vertical support structures farther apart, e.g., by moving the ringlets 231 to which the vertical support structures attach farther apart. FIG. 17 is a schematic diagram showing a top view of an outrigger with extension, in accordance with one exemplary embodiment. In this example, the extension is a beam positioned at the end of the outrigger and holding the ringlets 231 farther apart. Of course, the extension can be placed elsewhere on the outrigger and can be configured in any manner necessary or desirable for a given implementation, e.g., to position the ringlets 231 inline with or offset from the pulleys.

Figure 18:
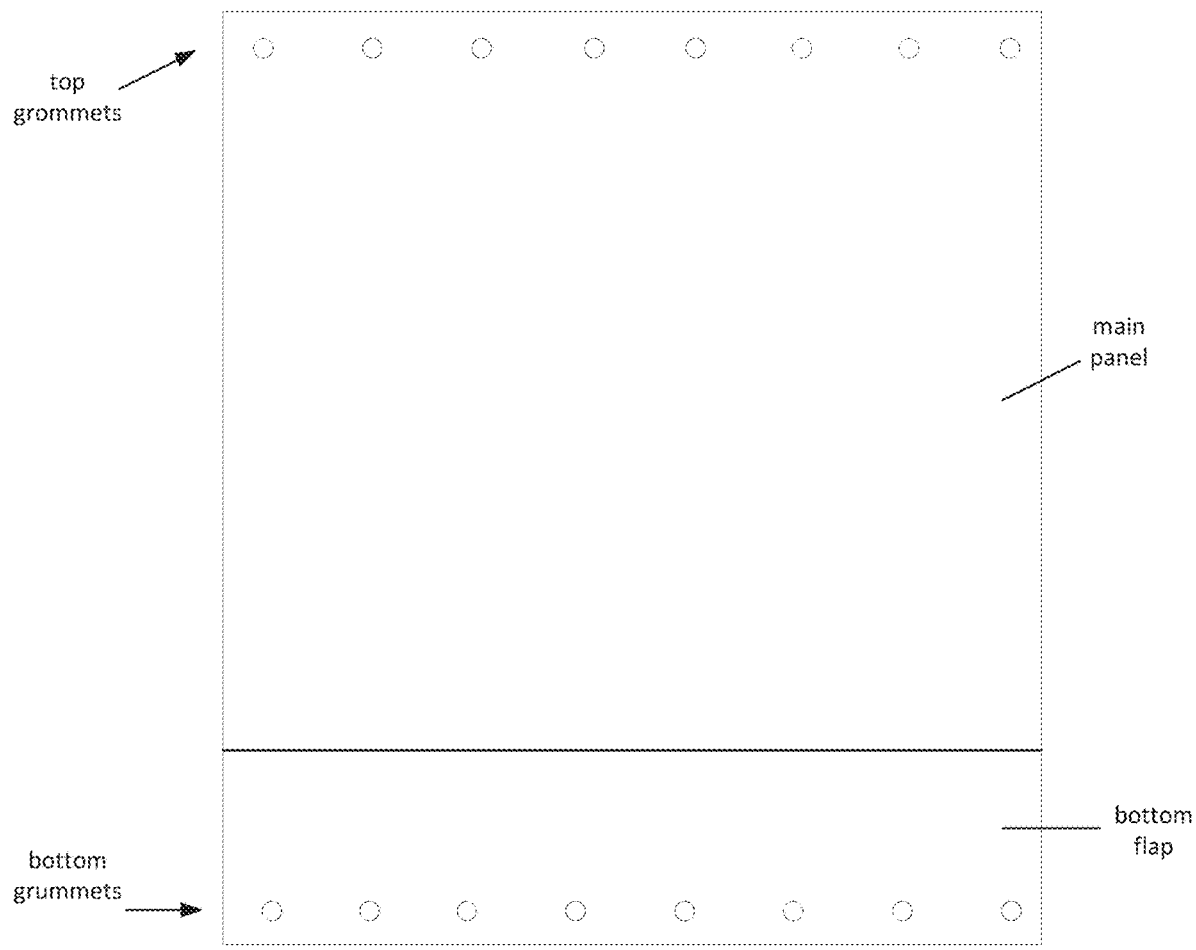
FIG. 18 is a schematic diagram showing a barrier member configured for connection with a lower barrier member, in accordance with one exemplary embodiment.
Figure 19:
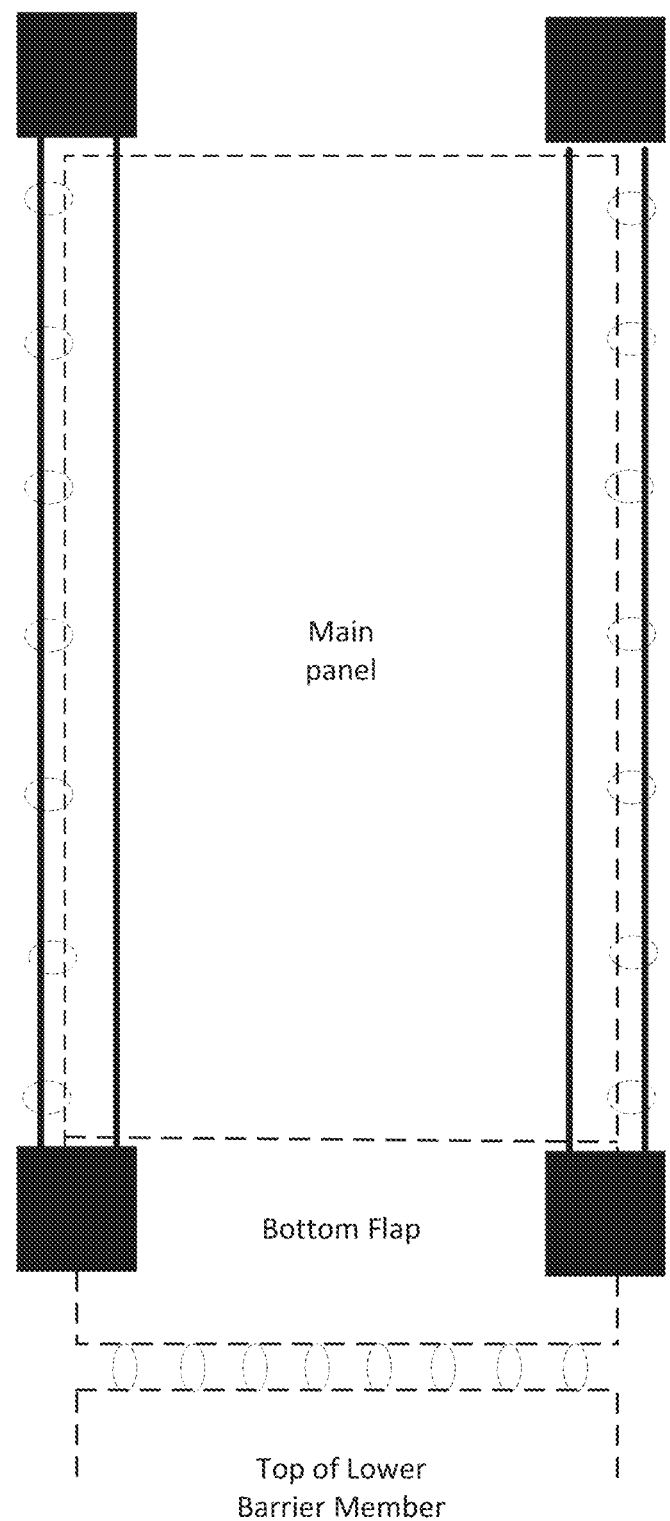
FIG. 19 is a schematic diagram showing the barrier member of FIG. 18 installed with the bottom flap attached to the top of the lower barrier member.
Figure 20:
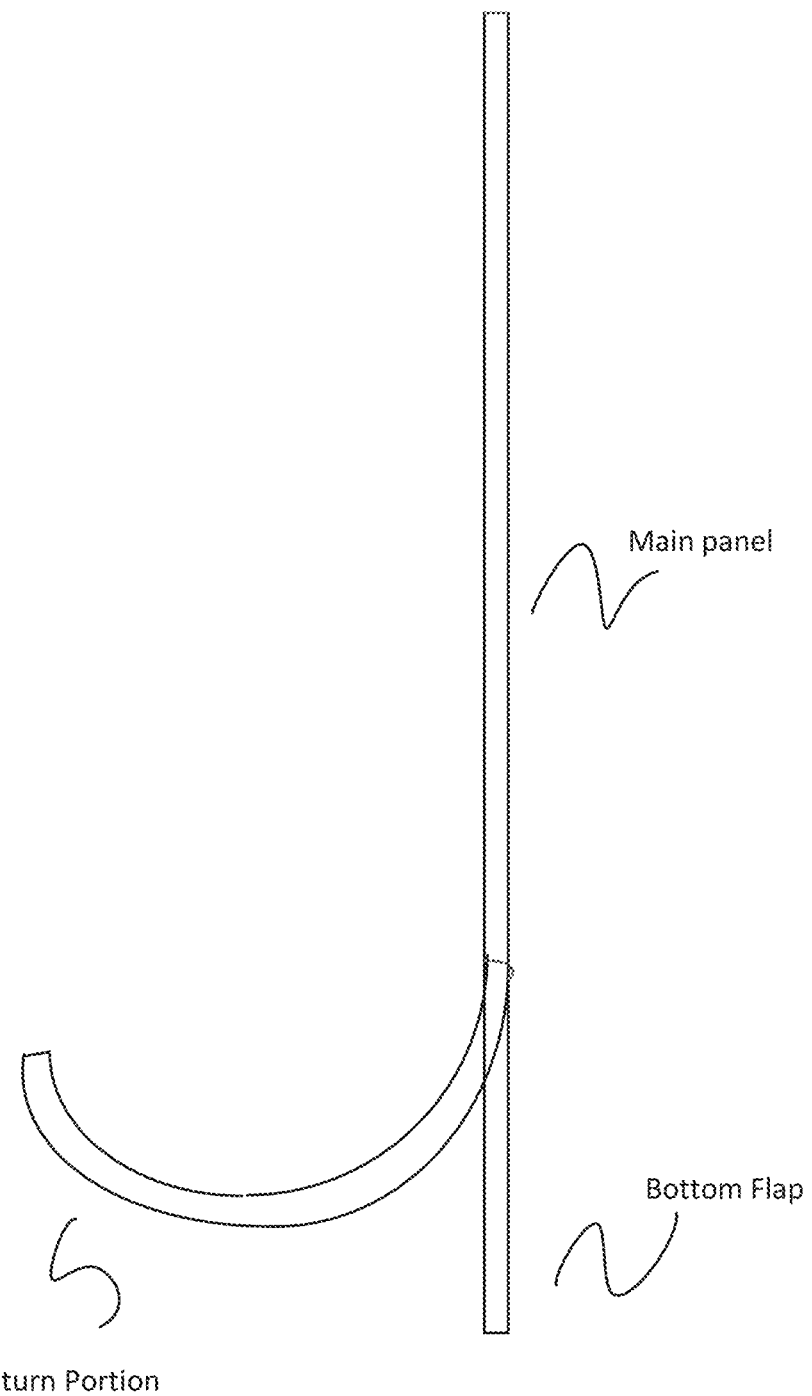
FIG. 20 is a schematic diagram showing a side edge view of a barrier member having both a return portion and a bottom flap, in accordance with one exemplary embodiment.

Just as there can be gaps between horizontally adjacent barrier members, there can be gaps between vertically adjacent barrier members, e.g., due to bowing of the top of the barrier member such as due to supporting its own weight. Thus, in certain exemplary embodiments, the bottom of a barrier member is attached to the top of the next lower barrier member, e.g., using zip ties or other connectors placed through grommets along the top and bottom edges of the barrier members. FIG. 18 is a schematic diagram showing a barrier member configured for connection with a lower barrier member, in accordance with one exemplary embodiment. Here, the barrier member is shown as having a bottom flap, although in other embodiments the barrier member can simply be fabricated longer, e.g., with no seam between a main panel and a separate bottom flap. FIG. 19 is a schematic diagram showing the barrier member of FIG. 18 installed with the bottom flap attached to the top of the lower barrier member. Of course, as described above, each barrier member preferably includes a return portion that attaches back into the building, and therefore a barrier member can include both a return portion and a separate bottom flap so that the barrier member can be attached to the top of the lower barrier member and the return portion can be attached back into the building. FIG. 20 is a schematic diagram showing a side edge view of a barrier member having both a return portion and a bottom flap, in accordance with one exemplary embodiment. Generally speaking, in order to install such a panel, the panel would be raised and attached to the vertical support members as discussed above, then the bottom flap would be attached to the top of the lower barrier member, and then the return portion would be attached back into the building, e.g., onto a third cable added between the two safety cables.

In certain exemplary embodiments, a special configuration is used to support the top of the barrier member such that the top edge is pulled laterally from each top corner.

FIG. 21 is a schematic diagram showing such a special configuration, in accordance with one exemplary embodiment. Here, at each top corner of the barrier member there is a top corner loop (e.g., a carabiner placed through a corner grommet) through which the hoisting rope slidably passes with attachment to an inboard grommet, e.g., using a hook at the end of the rope attached to a carabiner placed through the inboard grommet (referred to in FIG. 21 as the lateral support loop). When the barrier member is hoisted, outward lateral forces are placed on the lateral support loops, thereby stretching the top of the barrier member between the lateral support loops taut (although there still can be some bowing, which can be addressed by attaching the top of the barrier member to the bottom flap of the barrier member above it, for example, as shown and described with reference to FIGS. 18-20 above). As mentioned above, in certain exemplary embodiments, the barrier member is raised with the hoisting ropes running through the outboard pulleys or guides, as shown in FIG. 21. Among other things, this can help to stretch the barrier member further toward its edges and facilitate attachment to the outboard vertical support members in such embodiments.

Figure 22:
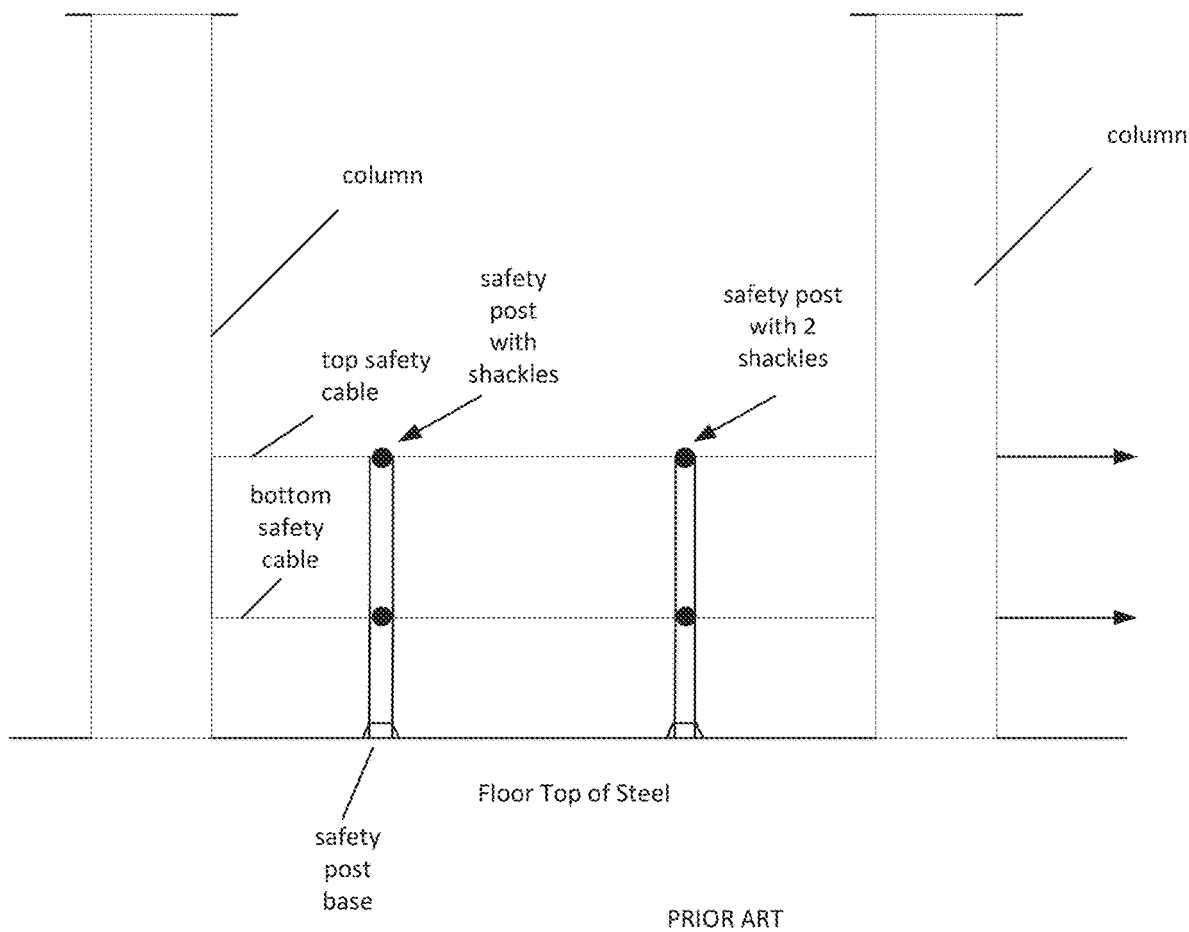
FIG. 22 is a schematic diagram showing a safety cable configuration in accordance with one exemplary embodiment.

As discussed above, a pair of safety cables may be provided, and such safety cables may be required by law. FIG. 22 is a schematic diagram showing a safety cable configuration in accordance with one exemplary embodiment. Here a top safety cable (typically placed 48 inches above the floor top-of-steel) and a bottom safety cable (typically placed 21 inches above the floor top-of-steel) passes between two or more columns (e.g., passing through preconfigured holes in an intermediate column) and is supported between columns by a number of safety posts. As discussed above, each safety post may be removably inserted into a corresponding safety post base that is attached to the floor top-of-steel, although in alternative embodiments the safety posts may be attached (e.g., welded) to the floor top-of-steel. Here, each safety post includes two shackles, and the safety cables are run through these shackles in order to provide vertical and lateral support for the safety cables. Generally speaking, the cables are put in place first, and then the safety posts are installed and the cables are shackled to the safety posts. In certain exemplary embodiments, as discussed above, a third cable (referred to able as the "return cable") positioned between the top and bottom safety cables (e.g., at a height of 42 inches above the floor top-of-steel) is used for attaching the return portion of the barrier member. It is envisioned that the bottom safety cable and the return cable will be in place before hoisting the barrier member, with the top safety cable installed after the barrier member is in place. This is because the top safety cable can hinder the hoisting and attachment of the barrier member. Also, it is envisioned that the safety posts will be installed after the barrier member is in place, also because they can hinder the hosting and attachment of the barrier member.

Figure 23:
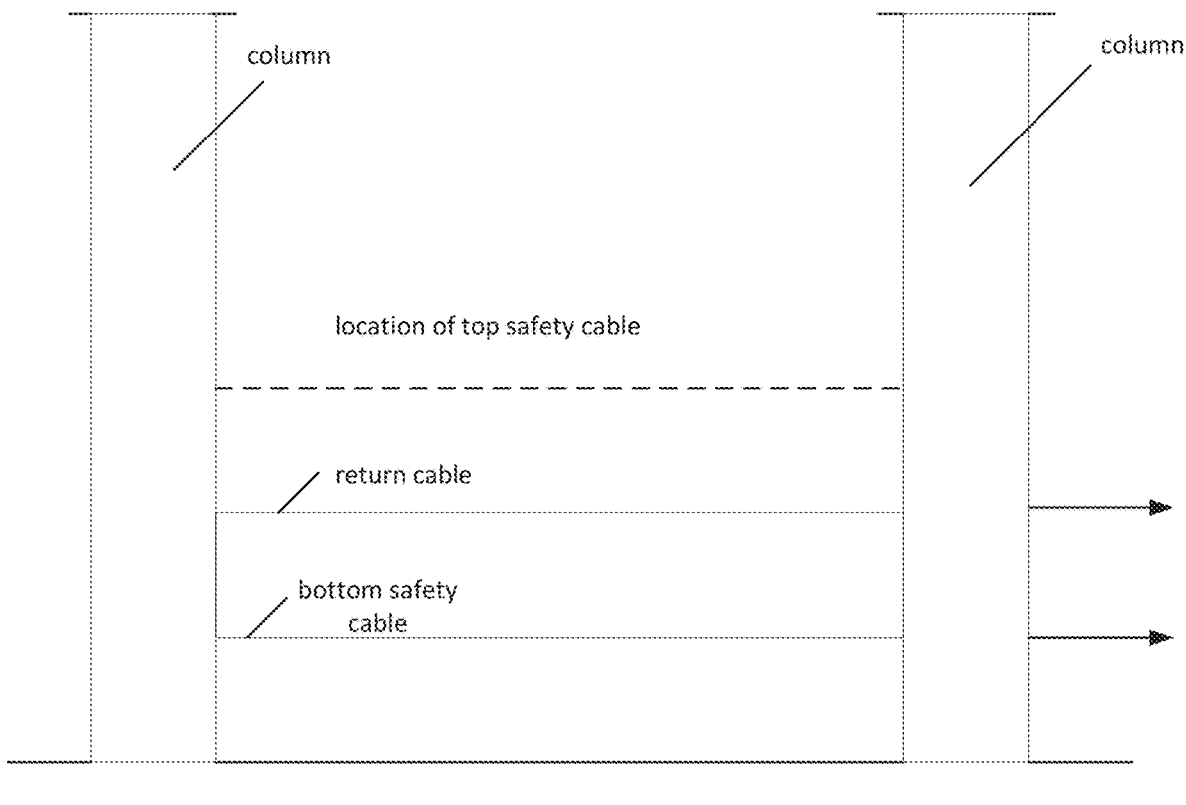
FIG. 23 is a schematic diagram showing the cable configuration in place for hoisting and attaching the barrier member, in accordance with one exemplary embodiment.

FIG. 23 is a schematic diagram showing the cable configuration in place for hoisting and attaching the barrier member, in accordance with one exemplary embodiment. Here, the bottom safety cable and the return cable are in place, but the top safety cable and the safety posts are not yet installed.

Figure 24:
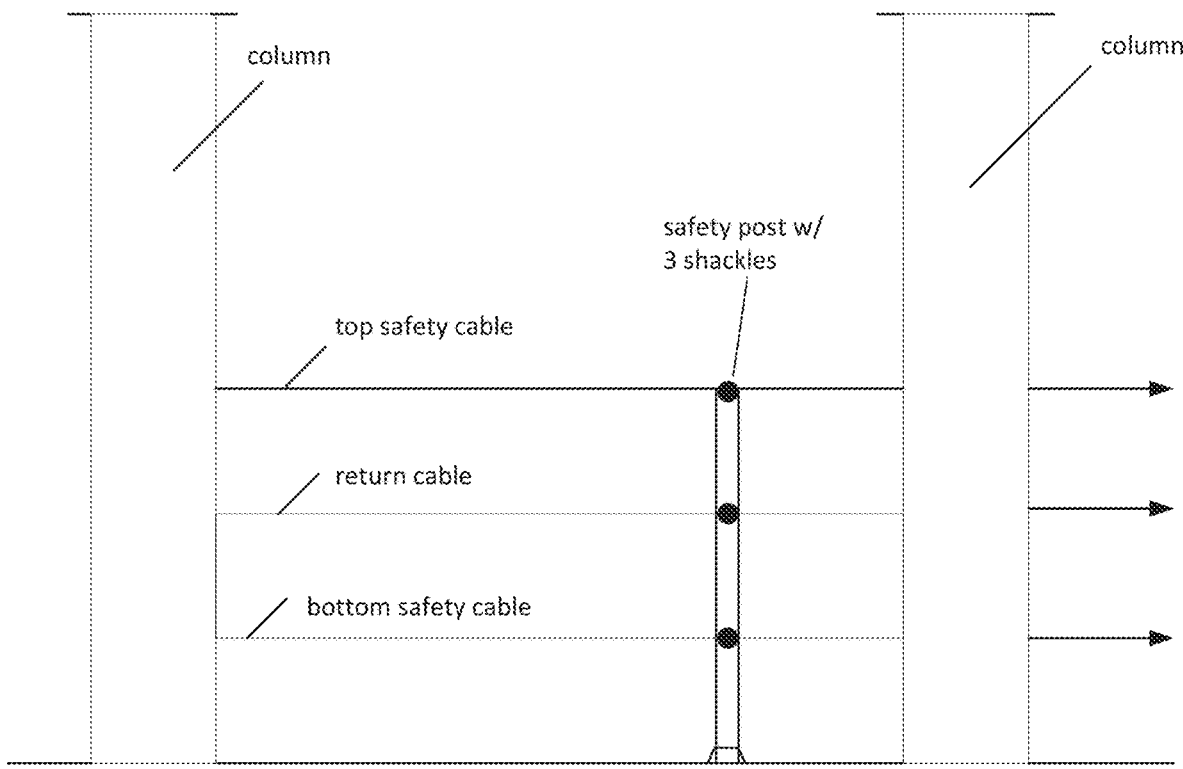
FIG. 24 is a schematic diagram showing the cable configuration after the barrier member has been hoisted and attached, in accordance with one exemplary embodiment.

FIG. 24 is a schematic diagram showing the cable configuration after the barrier member has been hoisted and attached, in accordance with one exemplary embodiment. Here, all three cables are in place, the return portion of the barrier member has been attached to the return cable (the attachment is not shown for convenience), and safety posts have been installed and shackled to the cables. In exemplary embodiments, the safety posts are reconfigured with three shackles to accommodate the added return cable.

It should be appreciated that there can be various "special case" situations in real-life construction projects that can require differently configured outriggers and/or additional components to support outriggers.

Figure 25A:
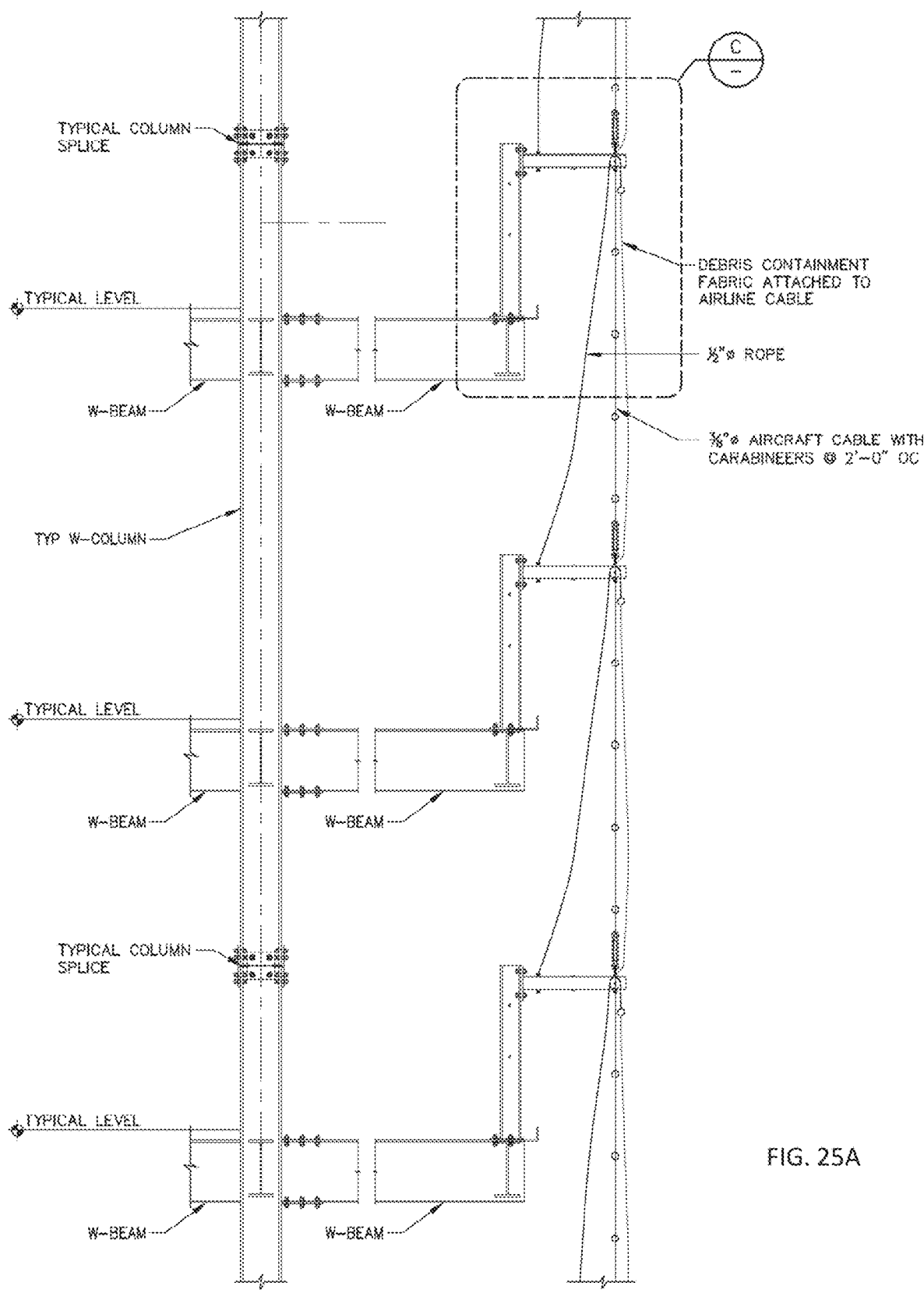
FIG. 25 is a schematic diagram showing vertical outrigger supports used in the context of a cantilevered structure, in accordance with one exemplary embodiment.
Figure 25B:
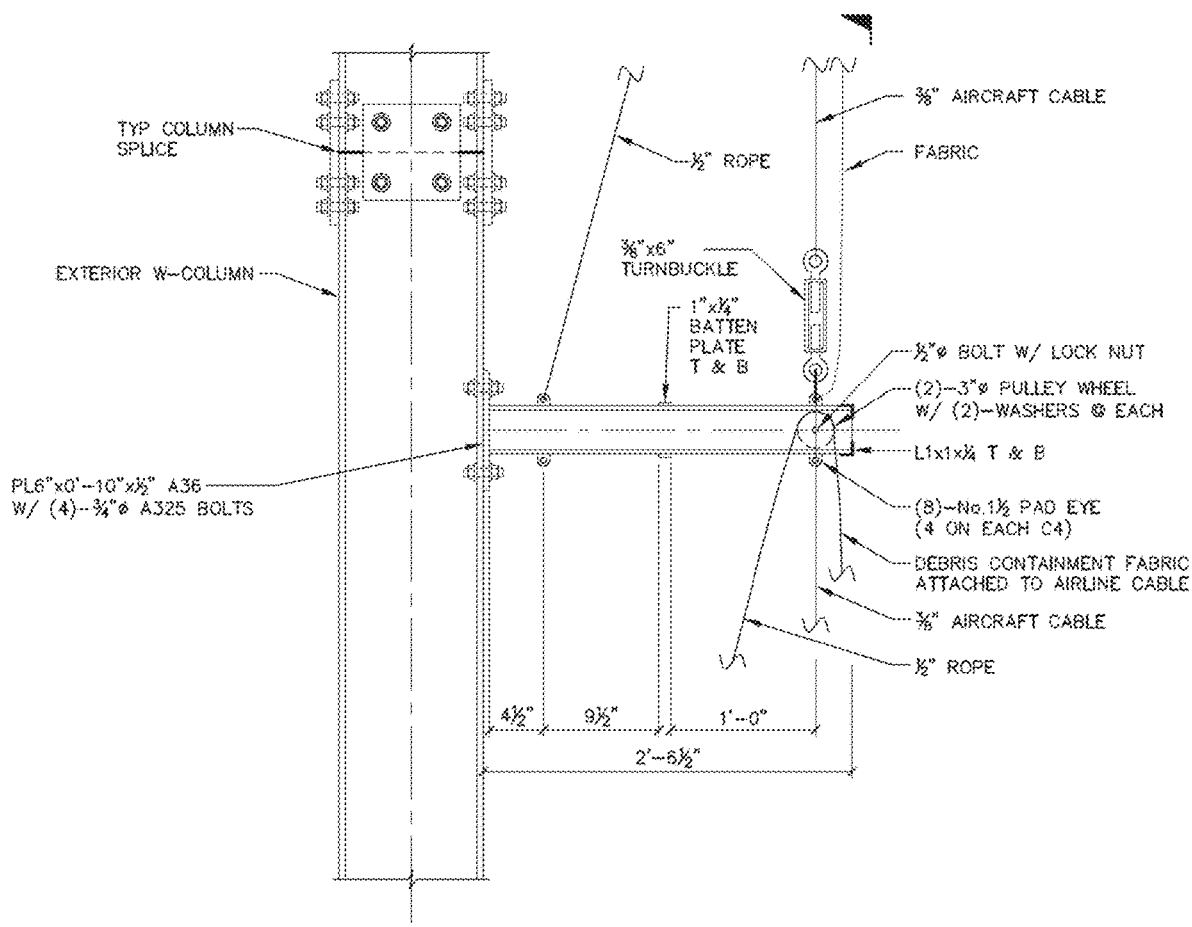
Figure 25C:
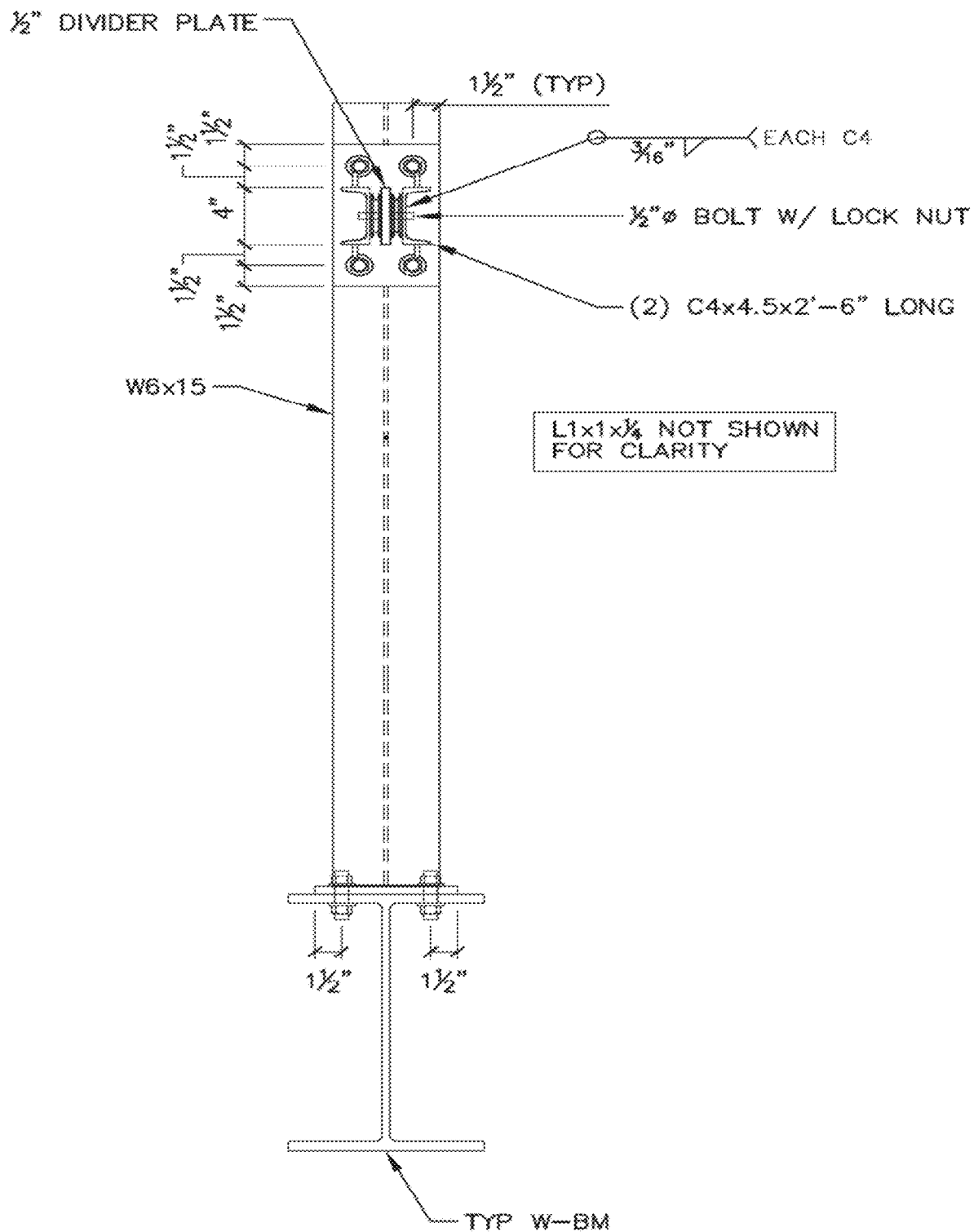

One such "special case" involves placement of barrier members at the outer edge of a cantilevered structure. Another such "special case" involves placement of barrier members that must extend above the roofline of the building, e.g., where outriggers must be placed above the roofline of the building. In certain exemplary embodiments, these "special case" scenarios will be solved by using additional vertical supports that attach to a building structure such as at the end of the cantilever, at the top of outer building columns, onto a deck or concrete slab, etc., to hold outriggers at appropriate positions. FIG. 25 is a schematic diagram showing vertical outrigger supports used in the context of a cantilevered structure, in accordance with one exemplary embodiment. Here, the outside columns are not at the edge of the building but instead there are cantilevered structures to the outside edge of the building. In this example, the vertical outrigger supports are configured to attach to (e.g., bolt onto) the cantilevered structure (e.g., to horizontal beams) and are configured to have outriggers bolted onto them as discussed above. Thus, in this exemplary embodiment, just as columns with pre-drilled holes would be delivered to the construction site and outriggers would be bolted onto those columns before the columns are installed, vertical outrigger supports can be delivered to the construction site and outriggers can be bolted onto the vertical outrigger supports before the vertical outrigger supports are installed. Alternatively, the vertical outrigger support and outrigger may be provided as a single unit (e.g., with the outrigger welded onto the vertical outrigger support or formed integrally with the vertical outrigger support). In any case, the vertical outrigger supports with attached outriggers then can be removed after the barrier members are removed. It should be noted that similar vertical outrigger supports can be used at the top of the building to support outriggers above the roofline of the building. The vertical outrigger support can be any appropriate configuration, such as, for example, with an "I" or "H" shaped cross-section the same as, or similar to, configurations used for columns and/or beams of the structure. When connecting to the top of a column, the vertical outrigger support can include the same type of splice as discussed above that would be used to attach two columns.

Another consideration for the debris containment system is for supporting winter protection tarps, fireproof tarps, or other additional components that may be needed or desired for a particular implementation. In certain exemplary embodiments, such additional components can be attached to the barrier member before hoisting, and then hoisted along with the barrier member. In such embodiments, the outriggers, columns, and column splices will be designed to support the added weight of such components.

It should be noted that, since the outside perimeter columns of a building are typically installed first, the column splices typically are designed to support the forces produced by the debris containment system elements and installation before the columns are supported by other structures, since these columns and debris containment system elements can be in place unsupported for some time.

Another consideration for the debris containment system is for lowering and re-raising a barrier member such as to all for materials to be loaded into a bay from outside of the building after installation of the barrier member. Generally speaking, it should be easy to lower an installed barrier member, even for embodiments in which the top of the barrier member is attached to the bottom flap of the upper barrier member. For example, in order to lower an installed barrier member on Floor 2, one generally would go up to Floor 3, disconnect the return portion of the Floor 3 barrier member from the Floor 3 return cable, and disconnect the bottom extension of the Floor 3 barrier member from the top of the Floor 2 barrier member, after which the Floor 2 barrier member can be lowered. The installation process would be repeated when re-raising the Floor 2 barrier member, e.g., raise the Floor 2 barrier member, go up to Floor 3, re-connect the bottom flap of the Floor 3 barrier member to the top of the Floor 2 barrier member, and re-connect the Floor 3 return portion to the Floor 3 return cable.

Another "special case" scenario is connecting outriggers to columns or beams that are not or cannot be configured for bolting on outriggers, e.g., on a tube steel column or beam, or where an outrigger needs to be attached to a column or beam that is not drilled with holes for attaching an outrigger such as an existing column or beam. In one exemplary embodiment, the mounting plate of a specially-configured outrigger is extended so as to place the mounting holes beyond the edges of the column or beam. The specially-configured outrigger then can be secured to the column or beam using one or more retainers that attach through the mounting holes.

Figure 26A:
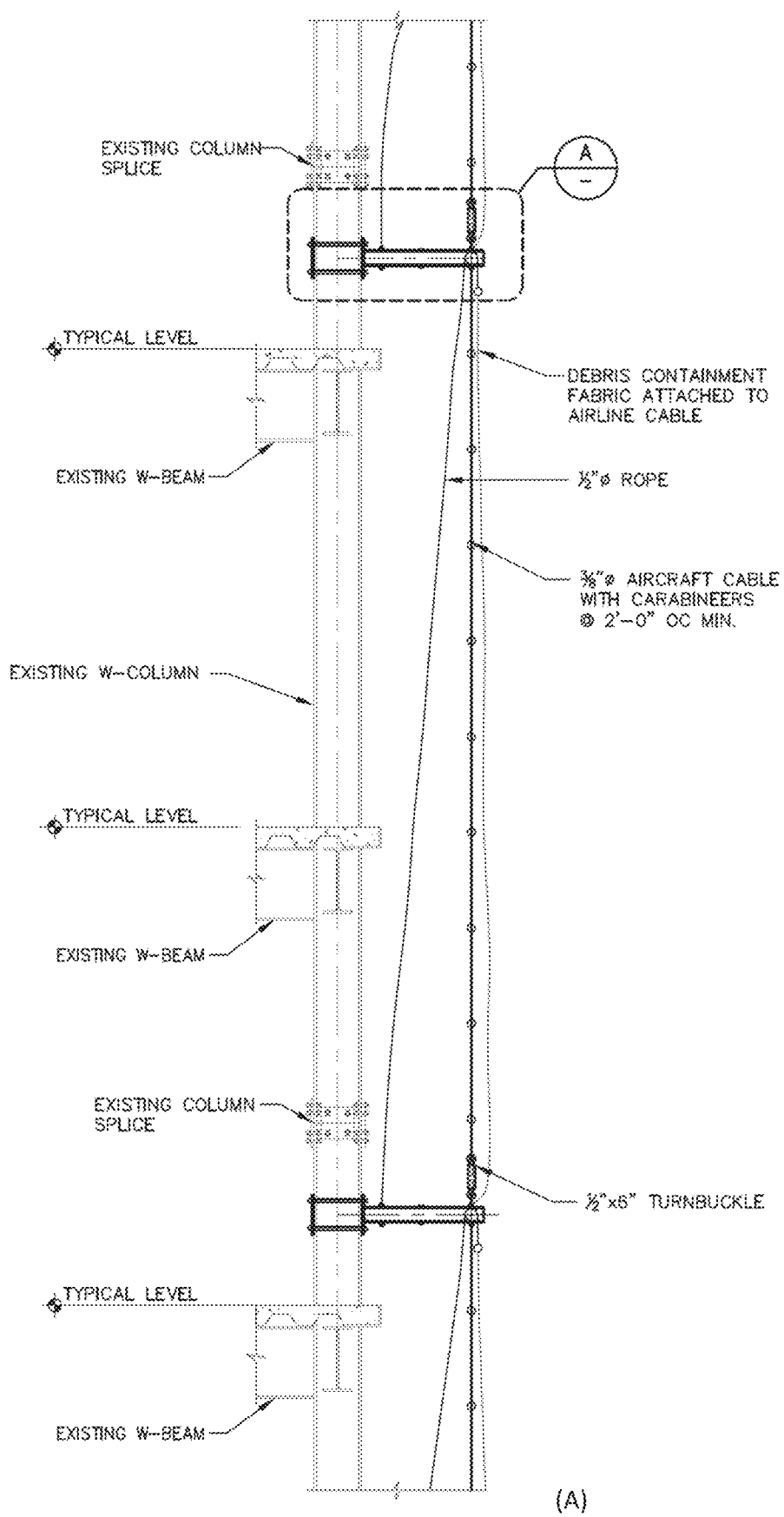
FIG. 26 is a schematic diagram showing a specially-configured outrigger with extended mounting plate, in accordance with one exemplary embodiment.
Figure 26B:
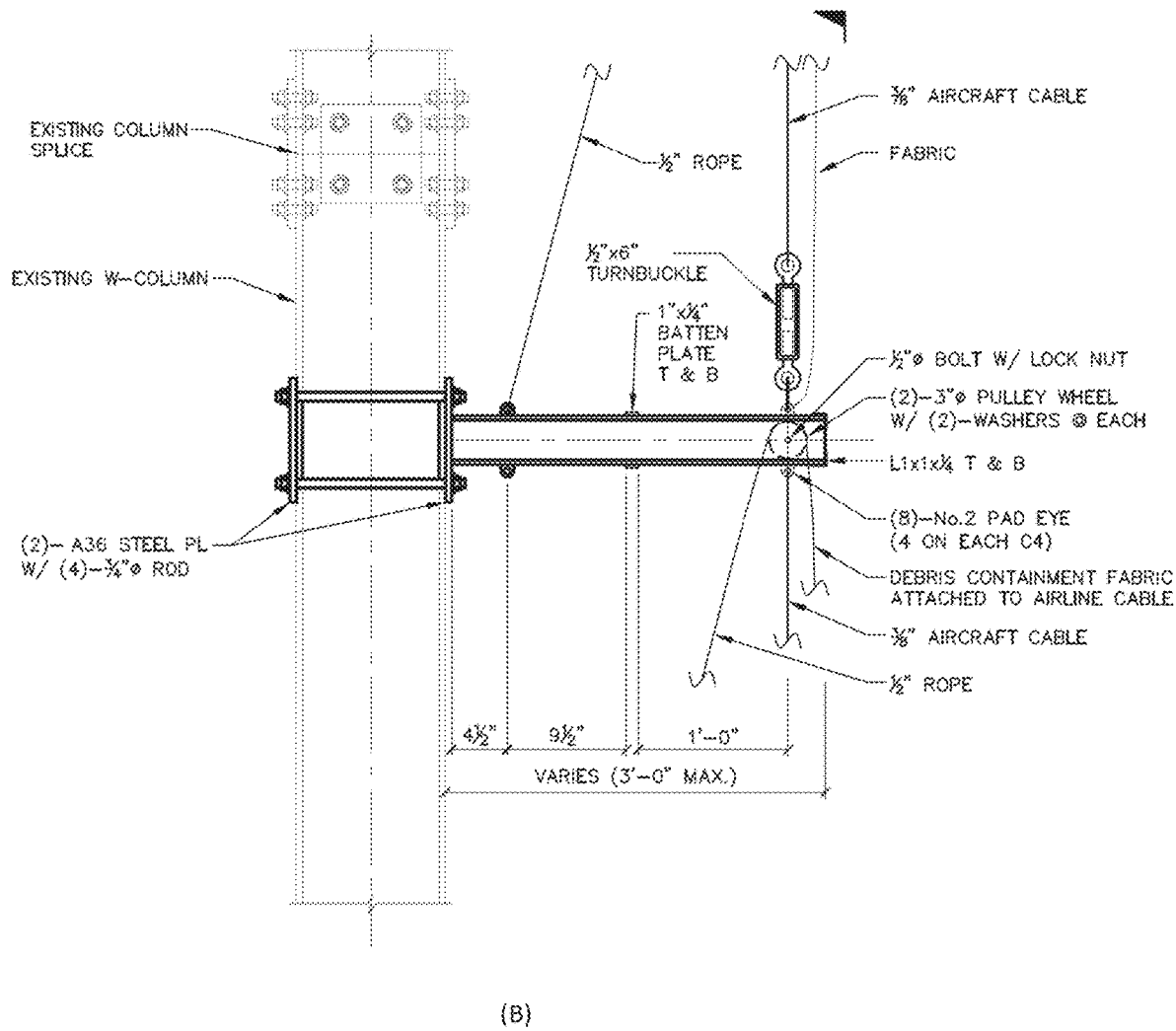
Figure 26C:
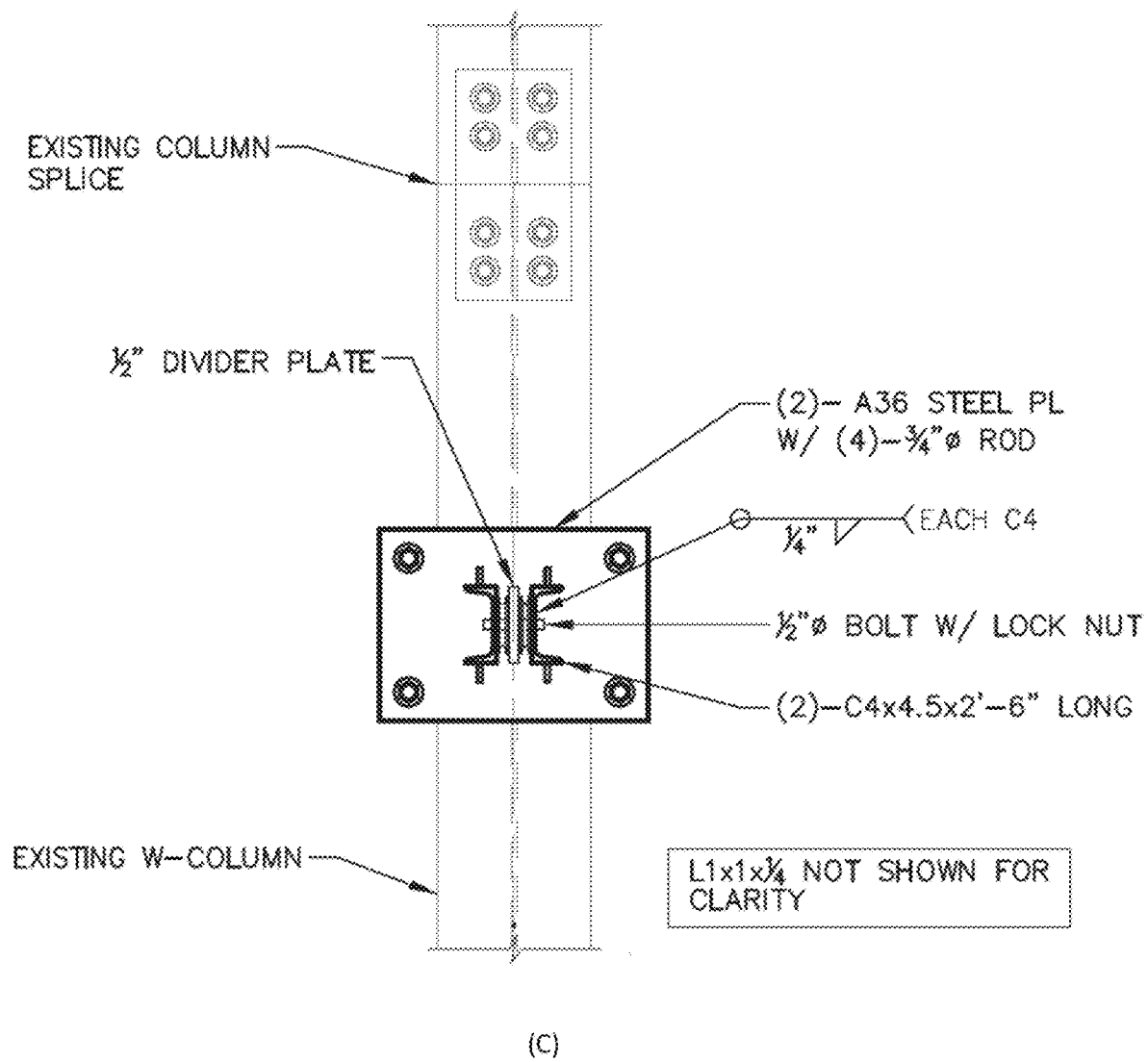
Figure 35:
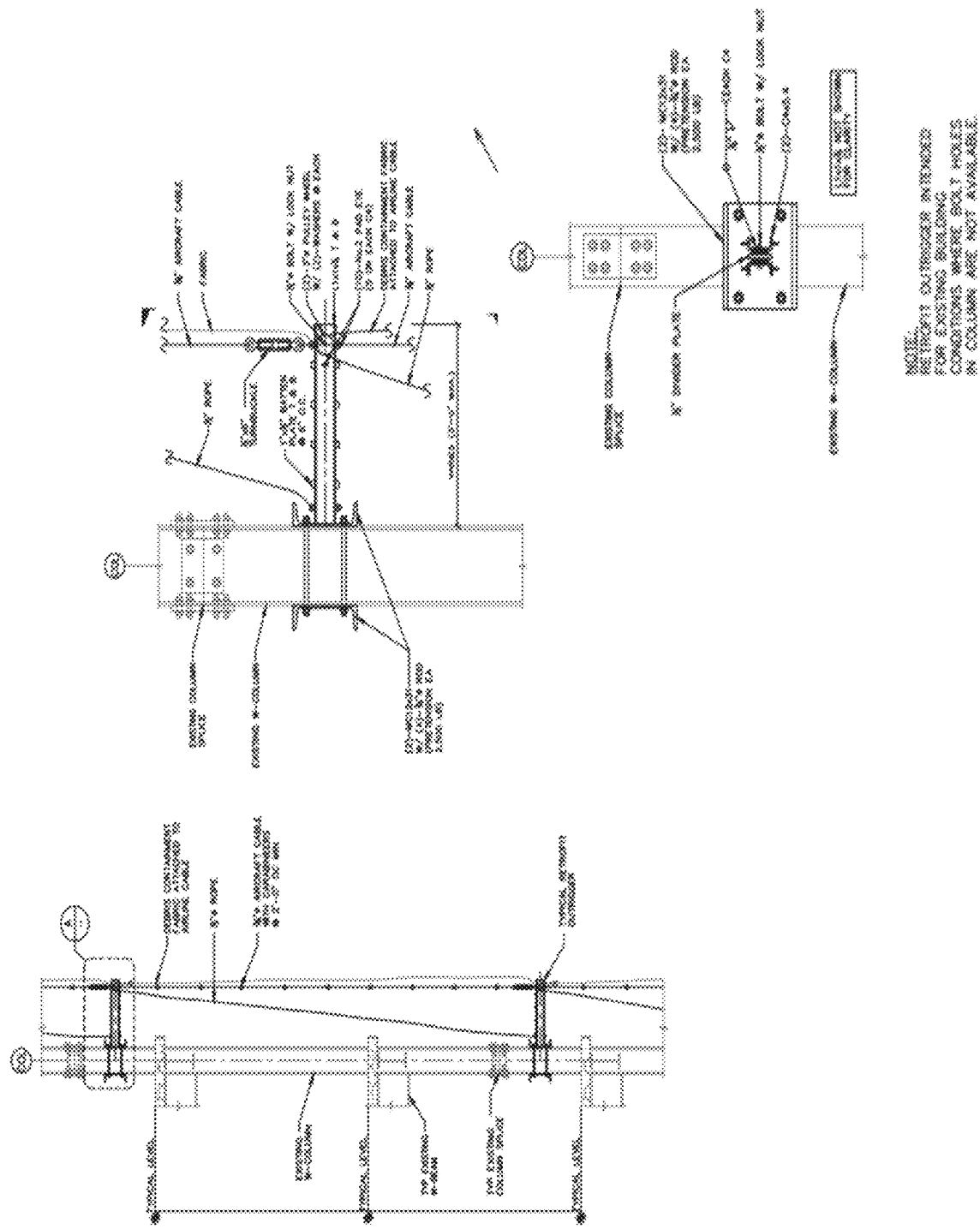
FIG. 35 is a schematic diagram showing an alternative mounting arrangement for retrofitting a channel unit onto a column or beam where bolt holes are not available, in accordance with one exemplary embodiment.

FIG. 26 is a schematic diagram showing a specially-configured outrigger with extended mounting plate, in accordance with one exemplary embodiment. FIG. 26(C) shows a front view of the specially-configured outrigger with extended mounting plate, in accordance with one exemplary embodiment. As mentioned above, the extended mounting plate places the mounting holes beyond the edges of the column. FIG. 26(B) shows a side view of the specially-configured outrigger of FIG. 26(C) mounted to the column using a backplate positioned on the opposite side of the column and attached to the extended mounting plate using long bolts. FIG. 26(A) shows a side view of columns with specially-configured outriggers of the type shown in FIGS. 26(B) and 26(C), in accordance with one exemplary embodiment. FIG. 35 is a schematic diagram showing an alternative mounting arrangement for retrofitting a channel unit onto a column or beam where bolt holes are not available, in accordance with one exemplary embodiment. As with the outriggers discussed above, these specially-configured outriggers generally would be mounted onto columns or beams prior to installation of the columns or beams on the building.

It should be noted that the extended mounting plate and/or the backplate could have additional features to help secure or stabilize the outrigger onto the column or beam, e.g., flanges that wrap onto the sides of the column or beam.

It should be noted that such specially-configured outriggers could be mounted to a column or beam using other types of retainers, such as, for example, square bend U-bolts or round bend U-bolts. The backplate retainer shown in FIG. 26 or square bend U-bolts might be particularly useful for mounting the outrigger to a column or beam having an "I," "H," or square cross-section, whereas round bend U-bolts might be particularly useful for mounting the outrigger to column or beam having a round cross-section (e.g., a pipe).

Figure 27:
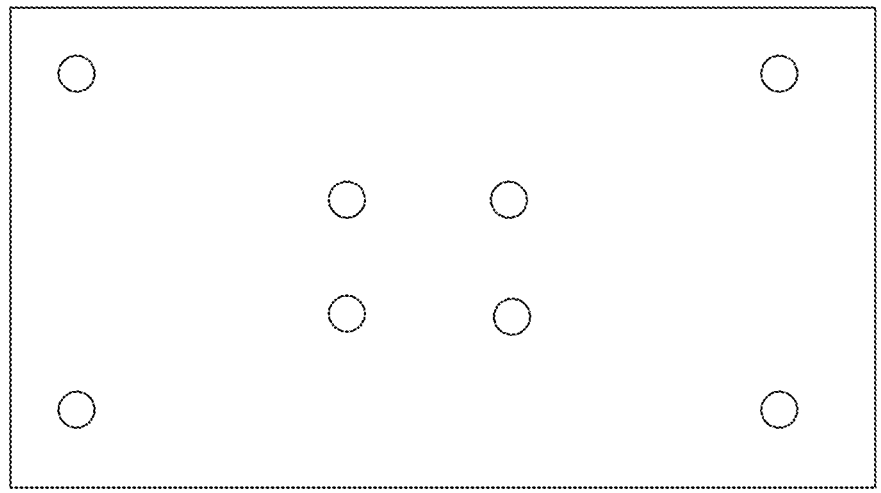
FIG. 27 is a schematic diagram of an extended mounting plate for use with a separate outrigger, in accordance with one exemplary embodiment.

In the examples shown in FIG. 26, the extended mounting plate is an integral part of the outrigger. However, it should be noted that the extended mounting plate could be separate from the outrigger, e.g., configured to be used with outriggers of the types described above such as by being bolted onto the outrigger. FIG. 27 is a schematic diagram of an extended mounting plate for use with a separate outrigger, in accordance with one exemplary embodiment. Here, the extended mounting plate has four inner mounting holes for mounting the outrigger onto the extended mounting plate and also has four outer mounting holes for mounting the extended mounting plate with attached outrigger onto a column or beam using one or more retainers.

Figure 28:
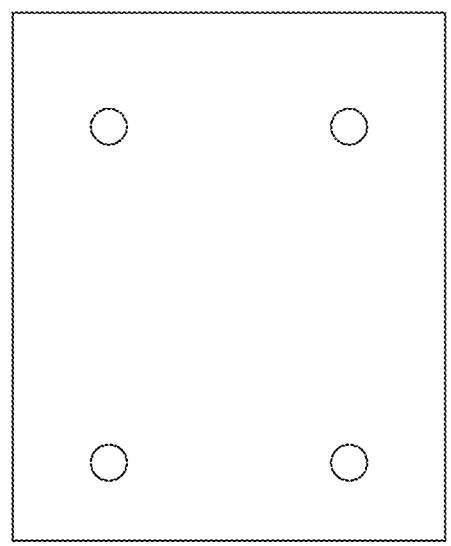
FIG. 28 is a schematic diagram showing a shim, in accordance with one exemplary embodiment.

It should be noted that, from time to time, it may be necessary or desirable to be able to adjust the extension length of an outrigger. Rather than configuring an outrigger for the adjusted extension length or having adjustable-length outriggers, one or more shims could be placed between the outrigger and the column/beam or between the outrigger and the extended mounting plate in order to adjust its extension length. Generally speaking, a shim would be a metal plate at least as large as the outrigger mounting plate and having holes that align with the holes in the outrigger mounting plate. FIG. 28 is a schematic diagram showing a shim, in accordance with one exemplary embodiment. Shims of different thicknesses (e.g., quarter inch, half inch, etc.) could be provided so that the extension length can be customized at the time of mounting the outrigger.

Figure 29:
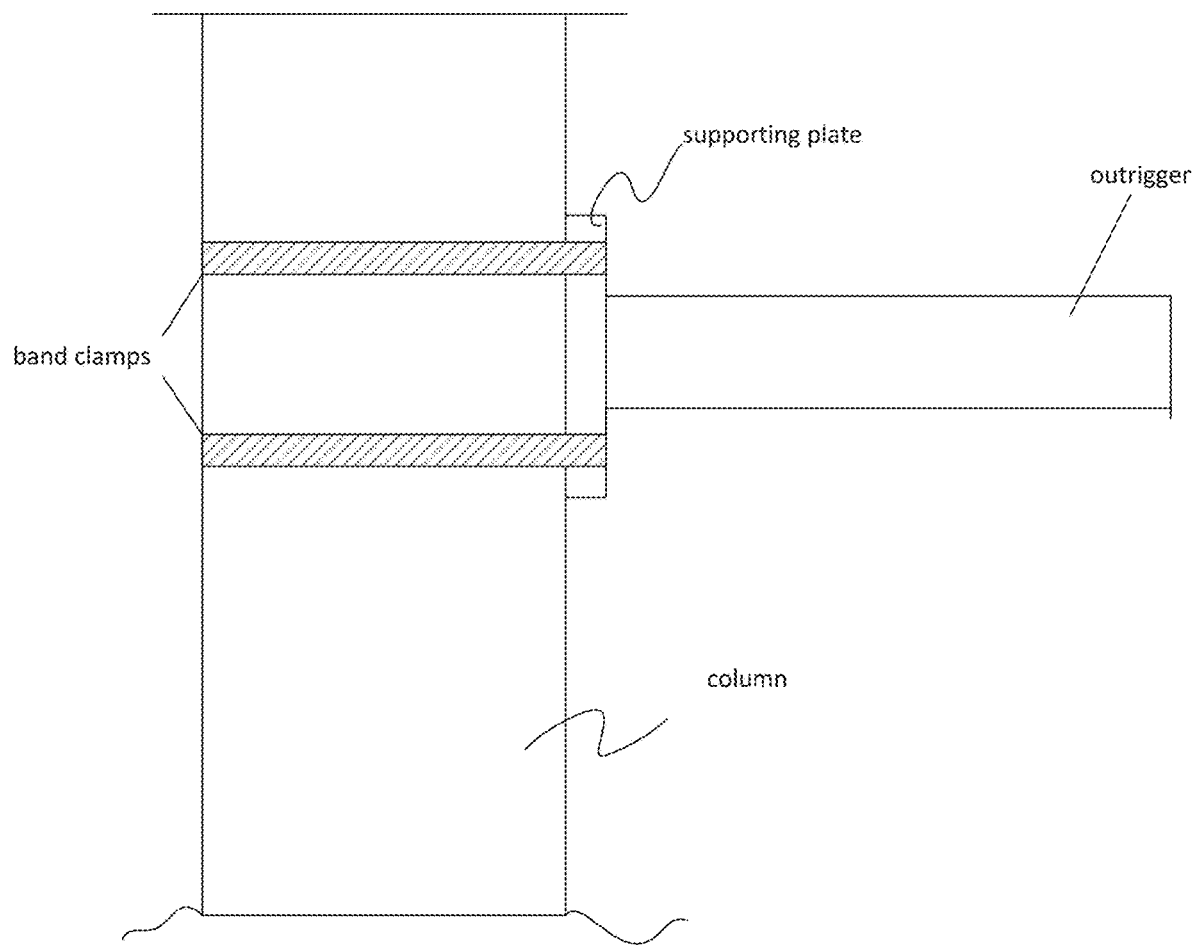
FIG. 29 is a schematic diagram showing specially-configured outrigger attached to a column using band clamps that circumscribe the structure and mounting plate(s) of the outrigger, in accordance with one exemplary embodiment.

It should be clear from the above discussion that outriggers can be produced in different configurations for attachment to columns, beams, or other structures in any of various ways, e.g., using fasteners, retainers, clamps, etc. For the sake of example, and without limitation, FIG. 29 is a schematic diagram showing specially-configured outrigger attached to a column using band clamps that circumscribe the structure and extended mounting plate(s) of the outrigger, where, as discussed above, the mounting plate(s) can be an integral part of the outrigger or separate from the outrigger. In such an embodiment, the mounting plate(s) can be configured with a band clamp guide (e.g., a channel or recess) in order to help retain the band clamp on the mounting plate(s).

In certain exemplary embodiments, certain lines and cables are color-coded in order to facilitate installation of the barrier members.

It should be noted that channel units of the types described herein can be configured for attachment to virtually any type of support member used in or on a building including both support members that are part of the building (e.g., columns and/or beams) and temporary support members that in turn attach to a part of the building (e.g., temporary vertical support members as discussed above). Furthermore, channel units of the types described herein can be configured to attach to support members using virtually any type of attachment mechanism. For example, while attachment of channel units and temporary support members to steel columns and beams using bolts and other fasteners is discussed above, channel units and temporary support members also can be attached to other types of structures including concrete beams, cast-in-place concrete structures, decks, concrete slabs, etc. Rather than using through-hole bolts to attach channel units to support structures, the support structures can be configured with other types of mounting elements including mounting elements of the types that are traditionally used in the construction industry, e.g., embedded anchors or sockets (e.g., threaded anchors into which bolts can be secured through holes in the channel unit mounting plate), embedded channel systems, embedded plate systems, embedded bolts onto which a channel unit or temporary support structure can be placed and secured with nuts, etc.

Figure 30:
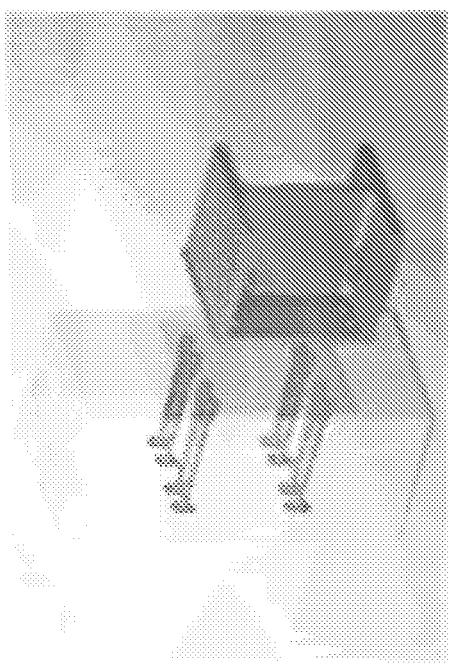
FIG. 30 is a schematic diagram showing an example of a channel unit attached to a concrete support structure such as a concrete column or cast-in-place concrete form using embedded anchors or sockets, in accordance with one exemplary embodiment.

FIG. 30 is a schematic diagram showing an example of a channel unit attached to a concrete support structure such as a concrete column or cast-in-place concrete form using embedded anchors or sockets, in accordance with one exemplary embodiment. In this example, the anchors or sockets are embedded in the concrete support structure, and the channel unit is attached using bolts that pass through holes in the channel unit mounting plate into the anchors or sockets. As above, the embedded anchors or sockets are positioned at the location of channel unit installation.

Figure 31:
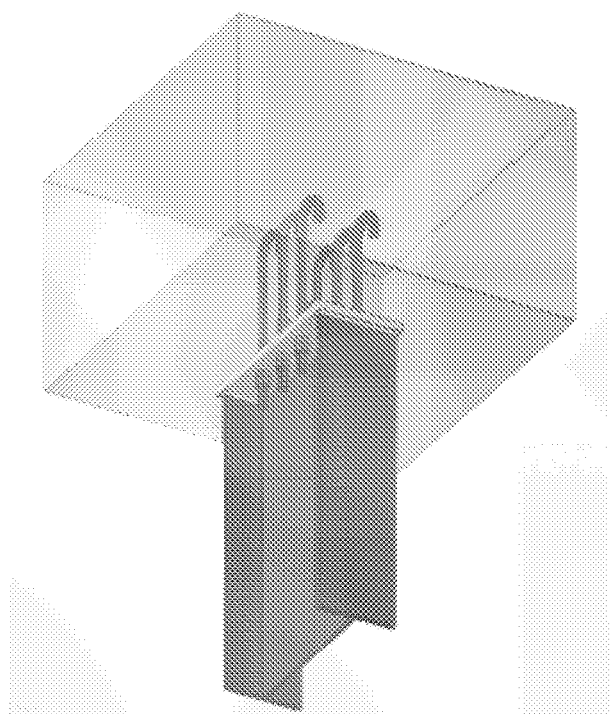
FIG. 31 is a schematic diagram showing an example of a channel unit attached to a concrete support structure such as a concrete column or cast-in-place concrete form using embedded bolts, in accordance with one exemplary embodiment.

FIG. 31 is a schematic diagram showing an example of a channel unit attached to a concrete support structure such as a concrete column or cast-in-place concrete form using embedded bolts, in accordance with one exemplary embodiment. In this example, the bolts are embedded in the concrete support structure and extend beyond the surface of the concrete support structure, and the channel unit is attached by placing the bolts through the holes in the channel unit mounting plate and securing the channel unit onto the bolts using nuts or other fasteners. As above, the embedded bolts are positioned at the location of channel unit installation.

Figure 32:
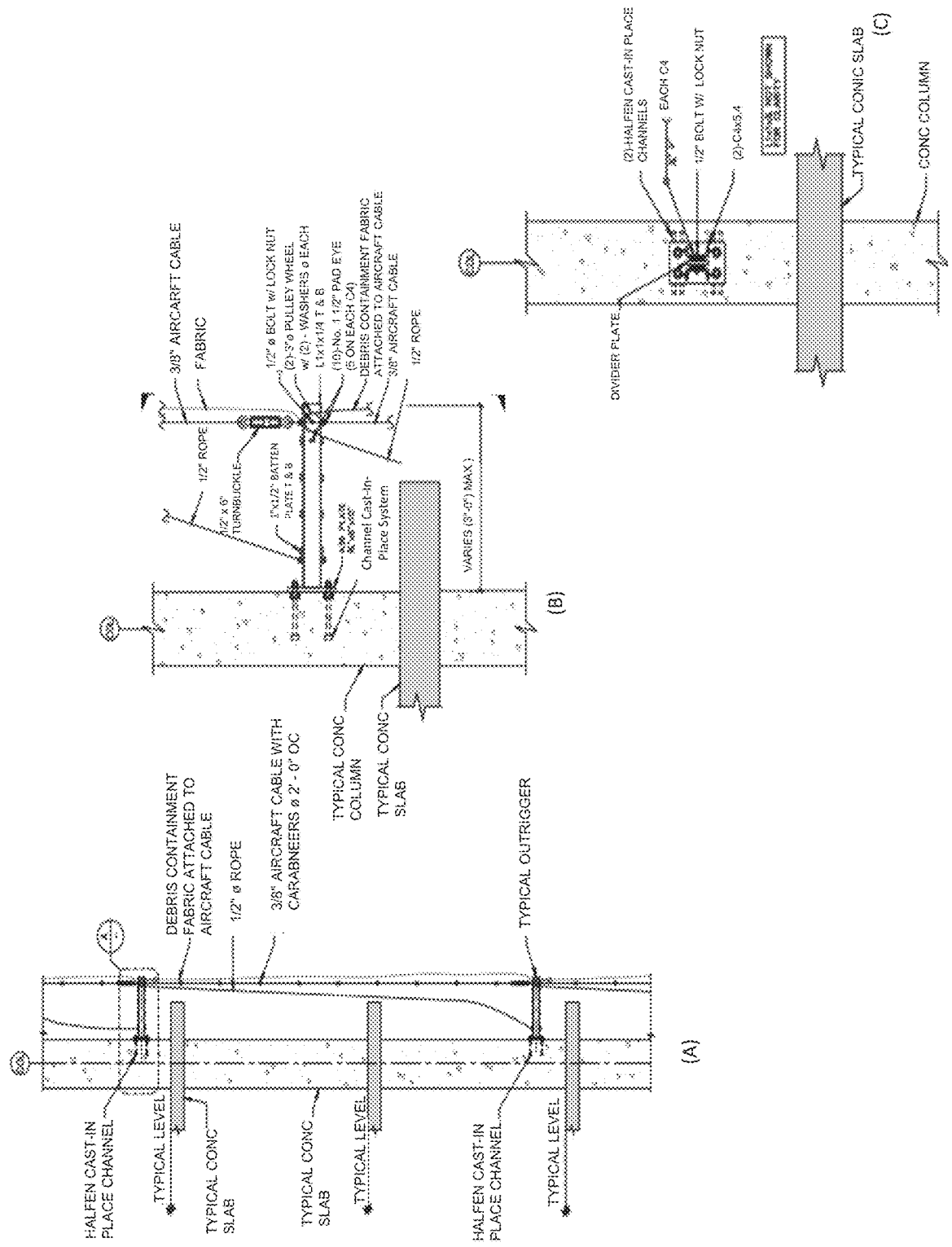
FIG. 32 is a schematic diagram showing an example of a channel unit attached to a concrete support structure such as a concrete column or cast-in-place concrete form using embedded channels that are configured to receive corresponding fasteners attached to the channel unit, in accordance with one exemplary embodiment.

FIG. 32 is a schematic diagram showing an example of a channel unit attached to a concrete support structure such as a concrete column or cast-in-place concrete form using embedded channels that are configured to receive corresponding fasteners attached to the channel unit, in accordance with one exemplary embodiment. FIG. 32(A) shows a side view of a concrete column supporting multiple channel units. FIG. 32(B) shows a detailed side view of the channel unit attachment to the concrete column via embedded channels. FIG. 32(C) shows a detailed front view of the channel unit attachment of FIG. 32(B). As above, the embedded channels are positioned at the location of channel unit installation.

Figure 33:
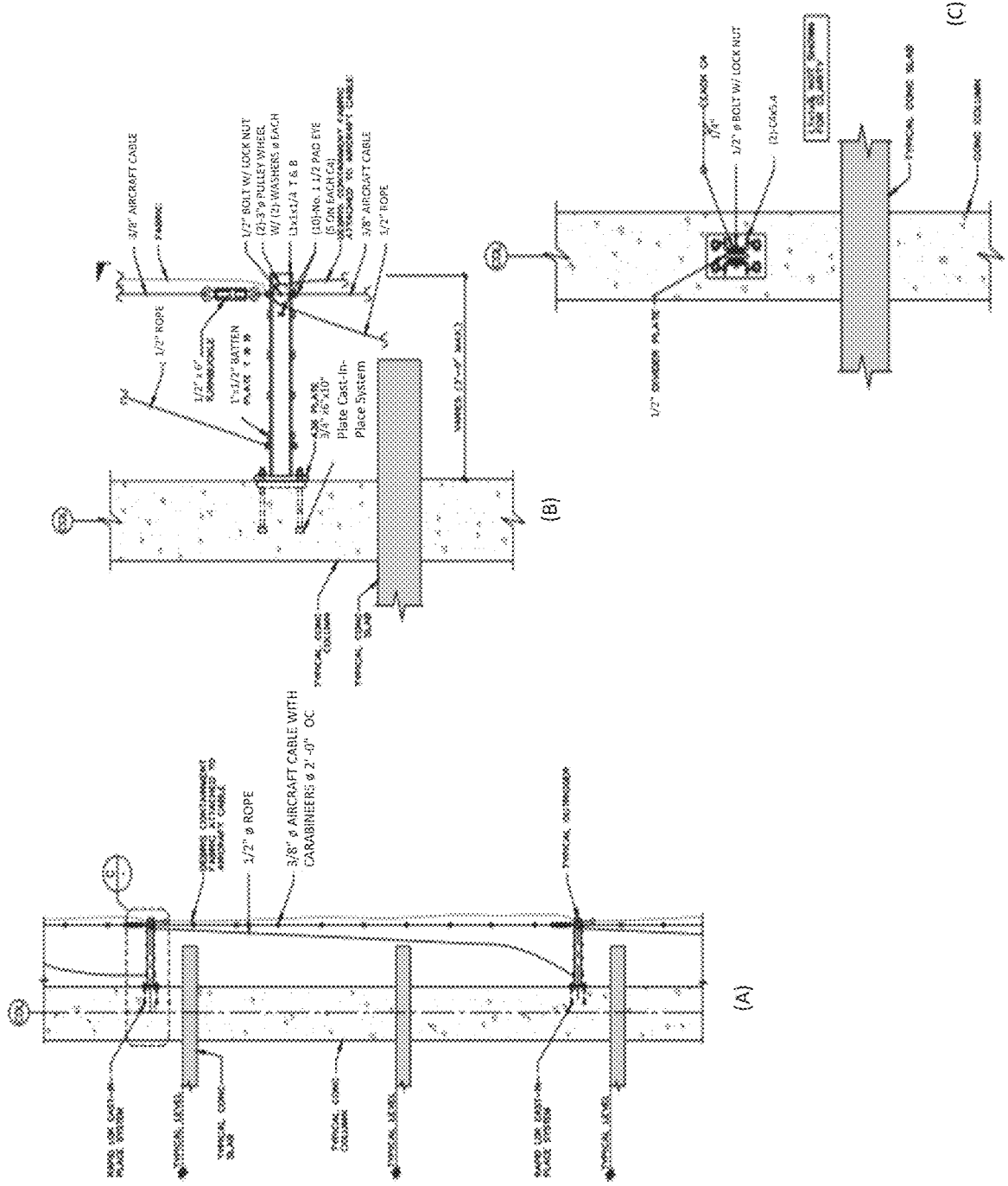
FIG. 33 is a schematic diagram showing an example of a channel unit attached to a concrete support structure such as a concrete column or cast-in-place concrete form using an embedded plate system that is configured to receive corresponding fasteners attached to the channel unit, in accordance with one exemplary embodiment.

FIG. 33 is a schematic diagram showing an example of a channel unit attached to a concrete support structure such as a concrete column or cast-in-place concrete form using an embedded plate system that is configured to receive corresponding fasteners attached to the channel unit, in accordance with one exemplary embodiment. FIG. 33(A) shows a side view of a concrete column supporting multiple channel units. FIG. 33(B) shows a detailed side view of the channel unit attachment to the concrete column via embedded plates. FIG. 33(C) shows a detailed front view of the channel unit attachment of FIG. 33(B). In this exemplary embodiment, the mounting plate of the channel unit may include studs that interface with keyholes in the embedded plate. As above, the embedded plate system is positioned at the location of channel unit installation.

Figure 34:
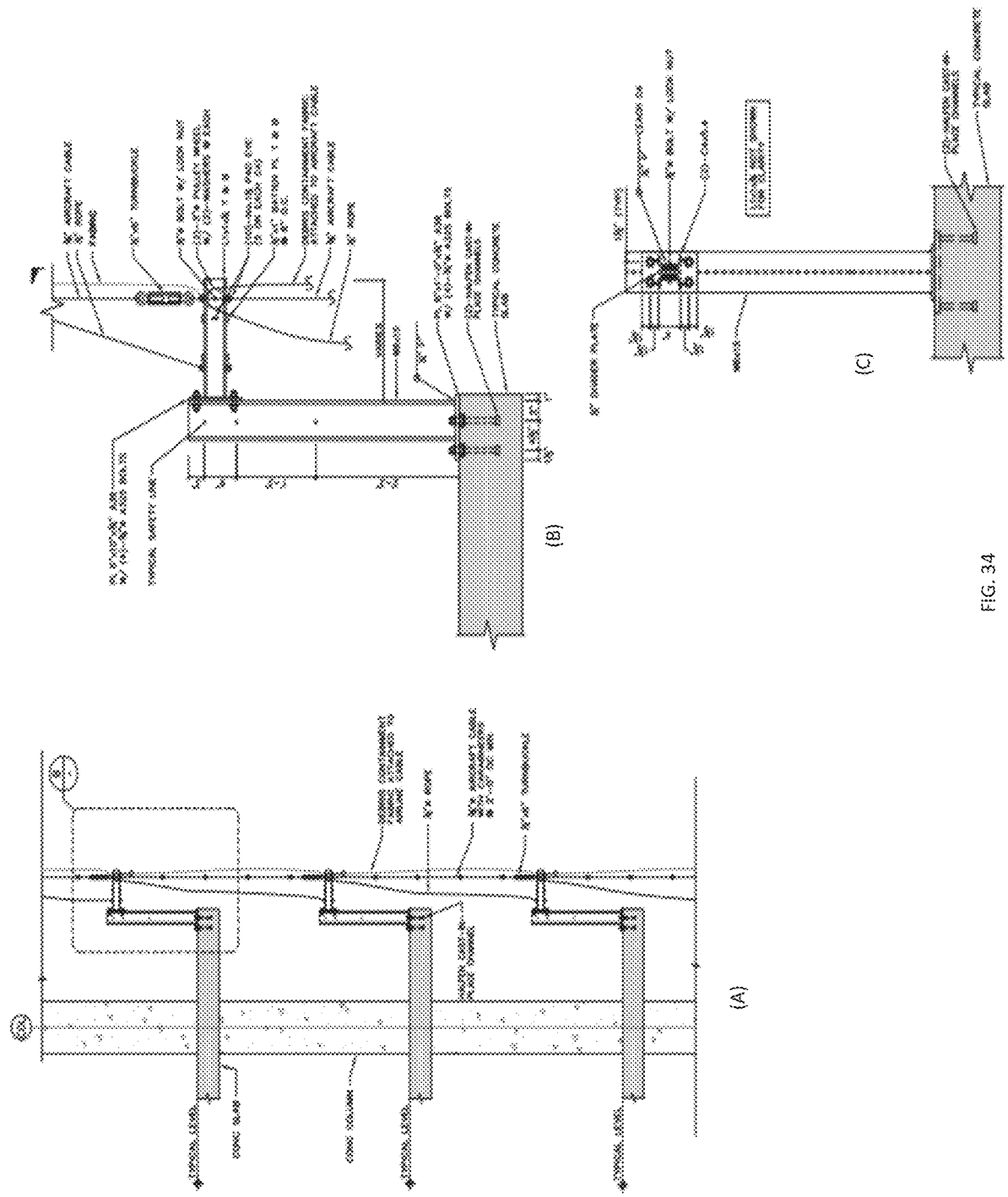
FIG. 34 is a schematic diagram showing an example of a temporary vertical support member attached to a concrete slab of a cantilever structure, in accordance with one exemplary embodiment.

FIG. 34 is a schematic diagram showing an example of a temporary vertical support member attached to a concrete slab of a cantilever structure, in accordance with one exemplary embodiment. FIG. 34(A) shows a side view of multiple cantilever structures with corresponding attached temporary vertical support members and channel units. FIG. 34(B) shows a detailed side view of the temporary vertical support member attachment. FIG. 34(C) shows a detailed front view of the temporary vertical support member attachment of FIG. 34(B). In this example, the temporary vertical support member is attached using embedded channels as discussed with reference to FIG. 32, although other types of mounting elements can be used, for example, as discussed with reference to FIGS. 30, 31, and 33.

Figure 36:
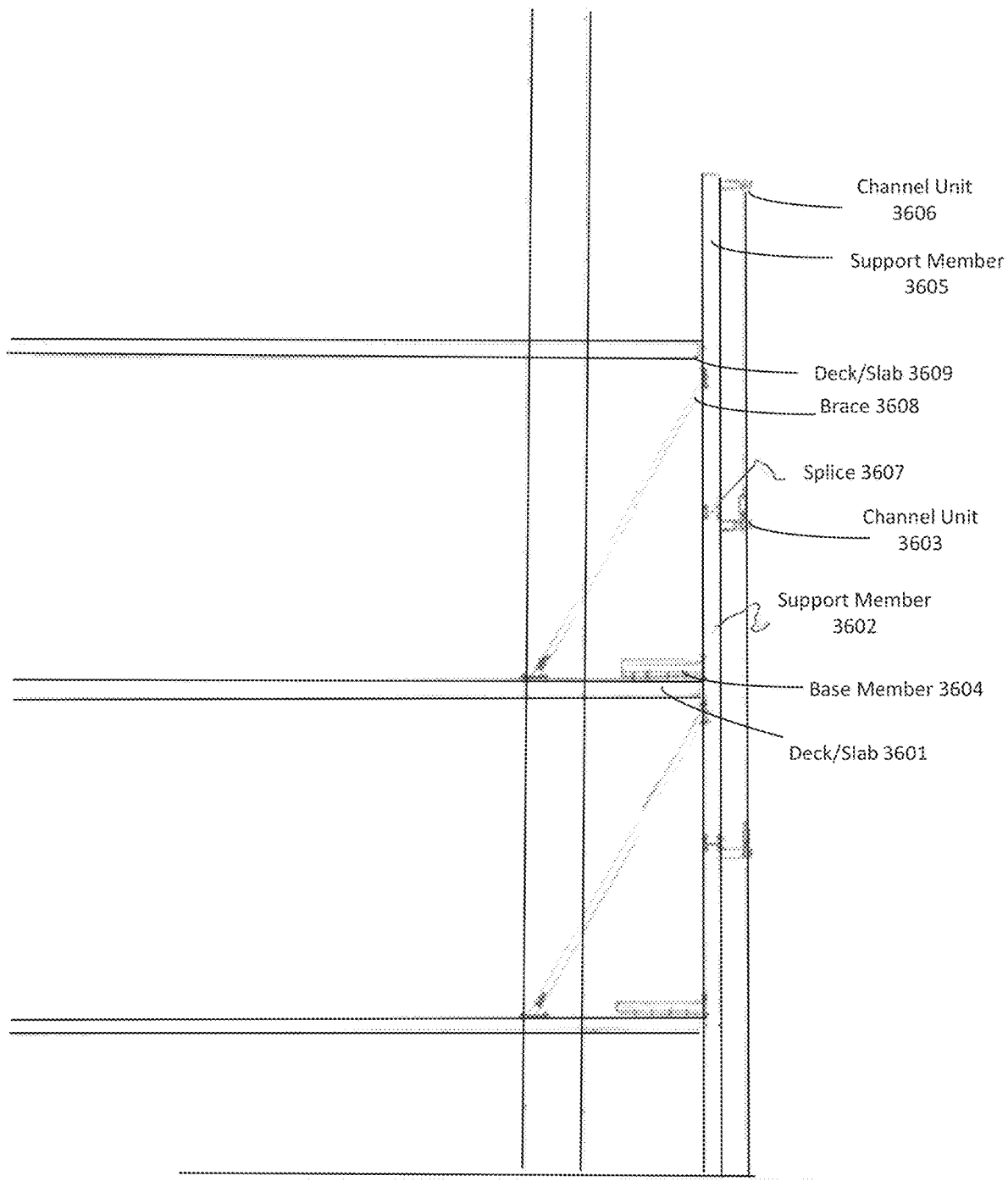
FIG. 36 is a schematic diagram showing an alternative debris containment system in which channel units are mounted on structures erected outside of the perimeter of the building, in accordance with one exemplary embodiment.

FIG. 36 is a schematic diagram showing an alternative debris containment system in which channel units are mounted on structures erected outside of the perimeter of the building, in accordance with one exemplary embodiment. In this example, support members with channel units can be installed as the building is being erected. For example, once the deck/slab 3601 has been fabricated (e.g., cast-in-place concrete), the base member 3604 can be attached to the deck/slab 3601 and also to the existing support member 3602 with channel unit 3603 installed from the lower floor. Then, support member 3605 with channel unit 3606 can be installed from the deck/slab 3601 by attaching the support member 3605 to the lower support member 3602 at splice 3607. A brace 3608 (e.g., an angle brace) can then be installed to at least temporarily support the support member 3605 from the deck/slab 3601 until the upper level deck/slab 3609 is fabricated and the support member 3605 is secured to the upper level deck/slab using a base member like 3604. Barrier members can be raised from the deck/slab 3601 via the channel unit 3606 in order to provide protection for work being done on or from the deck/slab 3601 including fabrication of the upper level deck/slab 3609. In this example, the channel units 3603 and 3606 may be shorter because they are already placed outside of the perimeter of the building by virtue of the support members 3602 and 3605 being located outside of the perimeter of the building.

Embodiments also include methods of engineering a building and building components to include mounting elements (e.g., holes, anchors/sleeves, bars, plates) at locations where channel units and other components (e.g., vertical support members and base members 3604) are to be installed, methods of installing channel units and other components (e.g., vertical support members and base members 3604) such as using bolts or other retainers, and methods raising and lowering barrier members using the channel units and related components.

While various exemplary embodiments are described above with reference to the use of grommets for securing the barrier member, it should be noted that other types of securing elements may be used in lieu of grommets, e.g., sewn seams, loops, or openings, for example, in a material with sufficient strength such as KEVLAR™

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A channel unit for installing barrier members on a building, the channel unit comprising:

an elongated body having a proximal end and distal end;

a mounting plate at the proximal end of the elongated body configured for mounting the channel unit onto a perimeter structural member of the building such that the distal end of the elongated body extends past an outer perimeter of the building;

a pair of adjacent line supports at the distal end of the elongated body including a left side line support configured to support a first line used to lift and support a left side barrier member and a right side line support configured to support a second line used to lift and support a right side barrier member;

a pair of adjacent line anchors at a top proximal end of the elongated body including a left side line anchor configured to secure a left side line from an upper-level channel unit and a right side line anchor configured to secure a right side line from the upper-level channel unit; and a pair of adjacent vertical support member anchors at a bottom distal end of the elongated body including a left side vertical support member anchor configured to secure a left side vertical support member to a lower-level channel unit and a right side vertical support member anchor configured to secure a right side vertical support member to the lower-level channel unit.

P2. A channel unit according to claim P1, wherein the adjacent line supports include pulleys.

P3. A channel unit according to claim P1, wherein the anchors include ringlets.

P4. A channel unit according to claim P1, wherein the elongated body is made of steel.

P5. A channel unit according to claim P1, wherein the elongated body is made of aluminum.

P6. A channel unit according to claim P1, wherein the elongated body is extendable to different lengths.

P7. A channel unit according to claim P1, further comprising at least one of the vertical support members.

P8. A channel unit according to claim P7, wherein the vertical support members include adjustable-length rods or cables.

P9. A channel unit according to claim P7, wherein the vertical support members include telescoping poles.

P10. A perimeter structural member for a building comprising mounting holes specifically arranged for mounting a channel unit according to any of claims 1-9.

P11. A perimeter structural member according to claim P10, comprising a vertical column.

P12. A perimeter structural member according to claim P10, comprising a horizontal beam.

P13. A perimeter structural member according to claim P10, comprising an "I" or "H" beam.

P14. A perimeter structural member according to claim P13, wherein the mounting holes are positioned on a flange of the beam.

P15. A perimeter structural member according to claim P13, wherein the mounting holes are positioned on a web of the beam.

P16. A barrier member for use with a channel unit according to any of claims P1-P9.

P17. A barrier member according to claim P16, comprising a net.

P18. A barrier member according to claim P16, comprising a plurality of grommets for securing the barrier member to a vertical support member.

P19. A building comprising:
a perimeter structural member according to any of claims P10-P15;
a channel unit according to any of claims P1-P9 attached to the perimeter structural member; and
a barrier member according to any of claims P16-P18 secured by the channel unit.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A channel unit for installing barrier members on a building as part of a building debris containment system, the channel unit comprising:
an elongated body having a proximal end, a distal end, and a mount at the proximal end of the elongated body configured for mounting the channel unit onto a support member at an outer perimeter of the building such that the distal end of the elongated body extends past the outer perimeter of the building; and
a pair of adjacent line supports at the distal end of the elongated body including a left side line support configured to support a left side line used to lift and support a first barrier member and a right side line support configured to support a right side line used to lift and support a second barrier member, wherein the channel unit is configured such that gaps between the first and second barrier members are substantially eliminated when the first and second barrier members are lifted and supported using the channel unit.

2. A channel unit according to claim 1, wherein the adjacent line supports include pulleys.

3. A channel unit according to claim 1, wherein the elongated body is made of steel.

4. A channel unit according to claim 1, wherein the elongated body is made of aluminum.

5. A channel unit according to claim 1, wherein the elongated body is extendable to different lengths.

6. A channel unit according to claim 1, wherein the mount includes a mounting plate.

7. A channel unit according to claim 1, wherein the mount is configured to mount to the support structure using at least one retainer.

8. A channel unit according to claim 1, wherein the mount and the support structure include corresponding mounting elements by which the channel unit is mounted to the support structure.

9. A channel unit according to claim 1, further comprising:
a pair of adjacent bottom vertical support member anchors at a bottom distal end of the elongated body including a left side bottom vertical support member anchor configured to secure a left side bottom vertical support member to a lower-level channel unit and a right side bottom vertical support member anchor configured to secure a right side bottom vertical support member to the lower-level channel unit.

10. A channel unit according to claim 9, wherein the bottom vertical support member anchors include ringlets.

11. A channel unit according to claim 9, wherein the bottom vertical support member anchors are disposed on a transverse extension at the distal end of the channel unit.

12. A channel unit according to claim 9, further comprising:
the left side bottom vertical support member; and
the right side bottom vertical support member.

13. A channel unit according to claim 12, wherein the vertical support members are adjustable-length vertical support members.

14. A channel unit according to claim 12, wherein the left side line is coupled to lift the first barrier member along the left side bottom vertical support member and wherein the right side line is coupled to lift the second barrier member along the right side bottom vertical support member.

15. A channel unit according to claim 1, further comprising:
a pair of adjacent top line anchors at a top proximal end of the elongated body including a left side top line anchor configured to secure a first line from an upper-level channel unit and a right side top line anchor configured to secure a second line from the upper-level channel unit.

16. A channel unit according to claim 1, further comprising:
a pair of adjacent top vertical support member anchors at a top distal end of the elongated body including a left side top vertical support member anchor configured to secure a left side top vertical support member to an upper-level channel unit and a right side top vertical support member anchor configured to secure a right side top vertical support member to the upper-level channel unit.

17. A channel unit according to claim 1, wherein the support member at the outer perimeter of the building is a perimeter structural member of the building or a temporary support member that is configured to attach to a perimeter structural member of the building.

18. A building debris containment system comprising:
a plurality of channel units according to claim 1, each channel unit mounted onto a distinct support member at an outer perimeter of a building such that the distal end of the elongated body extends past the outer perimeter of the building.

19. A system according to claim 18, at least one support member comprising a vertical column.

20. A system according to claim 18, at least one support member comprising a horizontal beam.

21. A system according to claim 18, wherein at least one channel unit is mounted onto an outward-facing surface of a distinct support member.

22. A system according to claim 21, wherein the outward-facing surface is a flange of the support member, and wherein mounting elements used to mount the channel unit onto the support member are positioned on the flange.

23. A system according to claim 21, wherein the outward-facing surface is a web of the support member, and wherein mounting elements used to mount the channel unit onto the support member are positioned on the web.

24. A system according to claim 18, further comprising at least one barrier member, each barrier member supported by two channel units.

25. A system according to claim 24, wherein at least one barrier member comprises a net.

26. A system according to claim 24, wherein at least one barrier member comprises a plurality of grommets for securing the barrier member to a vertical support member.

27. A system according to claim 24, wherein at least one barrier member comprises at least one of a return portion or side flaps.

28. A channel unit according to claim 2, wherein the pulleys are attached within the elongated body.

29. A channel unit according to claim 1, wherein:
the building includes two adjacent bays separated by a distance;
the left side line support is configured to support the left side line used to lift and support the first barrier member for a first bay of the two adjacent bays;
the right side line support is configured to support the right side line used to lift and support the second barrier member for a second bay of the two adjacent bays; and
the channel unit is configured such that each barrier member when lifted and supported extends beyond the edge of its corresponding bay overlapping at least a portion of the distance between the two adjacent bays.

30. A channel unit according to claim 1, further comprising:
the left side line coupled to lift and support a right side barrier member; and
the right side line coupled to lift and support a left side barrier member, such that the right side barrier member and the left side barrier member when lifted and supported at least partially overlap one another.

* * * * *